United States Patent
Stein et al.

(10) Patent No.: US 10,667,166 B2
(45) Date of Patent: May 26, 2020

(54) APPARATUS FOR COOPERATING WITH A MOBILE DEVICE

(71) Applicant: LiveU Ltd., Kfar Saba (IL)

(72) Inventors: Zeev Stein, Holon (IL); Ran Rahav, Rosh Haayin (IL); Meir Schreiber, Maccabim (IL); Baruch Altman, Pardes Hana (IL)

(73) Assignee: LiveU Ltd., Kfar Saba (IL)

( * ) Notice: Subject to any disclaimer, the term of this patent is extended or adjusted under 35 U.S.C. 154(b) by 234 days.

(21) Appl. No.: 15/961,357

(22) Filed: Apr. 24, 2018

(65) Prior Publication Data
US 2018/0242185 A1 Aug. 23, 2018

Related U.S. Application Data

(63) Continuation of application No. 15/091,090, filed on Apr. 5, 2016, now Pat. No. 9,980,171, which is a
(Continued)

(51) Int. Cl.
*H04W 88/06* (2009.01)
*G06F 1/16* (2006.01)
(Continued)

(52) U.S. Cl.
CPC ........ *H04W 28/021* (2013.01); *G06F 1/1632* (2013.01); *G06F 1/1637* (2013.01);
(Continued)

(58) Field of Classification Search
CPC .... G06F 1/1632; G06F 1/1637; G06F 1/1656; H04M 1/72527
See application file for complete search history.

(56) References Cited

U.S. PATENT DOCUMENTS

| 5,280,470 A | 1/1994 | Buhrke et al. |
| 5,699,413 A | 12/1997 | Sridhar |
| (Continued) | | |

FOREIGN PATENT DOCUMENTS

| EP | 1 863 304 A1 | 12/2007 |
| EP | 2 824 945 | 1/2015 |
| (Continued) | | |

OTHER PUBLICATIONS

International Application PCT/IB2013/053843 Search Report dated Aug. 21, 2013.
(Continued)

*Primary Examiner* — Raj Jain
(74) *Attorney, Agent, or Firm* — Finnegan, Henderson, Farabow, Garrett & Dunner, LLP

(57) ABSTRACT

An apparatus for cooperating with a mobile device having an embedded transceiver is disclosed. The apparatus includes a housing and a mechanical connector on the housing, the mechanical connector being configured to mechanically retain the mobile device. At least one port within the housing conveys energy to at least one auxiliary wireless transceiver associable with the apparatus. The apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver.

24 Claims, 11 Drawing Sheets

Related U.S. Application Data continuation-in-part of application No. 14/292,234, filed on May 30, 2014, now Pat. No. 9,369,921, and a continuation-in-part of application No. 14/199,324, filed on Mar. 6, 2014, now Pat. No. 9,338,650.

(60) Provisional application No. 61/829,389, filed on May 31, 2013, provisional application No. 61/784,630, filed on Mar. 14, 2013.

(51) Int. Cl.

| | | |
|---|---|---|
| *H04W 4/80* | (2018.01) | |
| *H04W 28/02* | (2009.01) | |
| *H04W 72/04* | (2009.01) | |
| *H04M 1/725* | (2006.01) | |
| *H04W 12/06* | (2009.01) | |
| *H04L 29/06* | (2006.01) | |
| *H04W 12/00* | (2009.01) | |
| *H04W 12/02* | (2009.01) | |

(52) U.S. Cl.
CPC .............. *H04L 63/18* (2013.01); *H04L 65/60* (2013.01); *H04L 65/80* (2013.01); *H04M 1/72527* (2013.01); *H04W 4/80* (2018.02); *H04W 12/003* (2019.01); *H04W 12/0013* (2019.01); *H04W 12/02* (2013.01); *H04W 12/06* (2013.01); *H04W 72/0453* (2013.01); *H04W 88/06* (2013.01); *H04M 1/72522* (2013.01); *H04M 2250/52* (2013.01)

(56) References Cited

U.S. PATENT DOCUMENTS

| | | |
|---|---|---|
| 5,771,229 A | 6/1998 | Gavrilovich |
| 6,154,637 A | 11/2000 | Wright et al. |
| 6,253,247 B1 | 6/2001 | Bhaskar et al. |
| 6,288,753 B1 | 9/2001 | DeNicola et al. |
| 6,496,477 B1 | 12/2002 | Perkins et al. |
| 6,510,553 B1 | 1/2003 | Hazra |
| 6,647,015 B2 | 11/2003 | Malkemes et al. |
| 6,683,877 B1 | 1/2004 | Gibbs et al. |
| 6,754,872 B2 | 6/2004 | Zhang et al. |
| 6,757,256 B1 | 6/2004 | Anadakumar et al. |
| 6,774,926 B1 | 8/2004 | Ellis et al. |
| 6,785,330 B1 | 8/2004 | Whealton et al. |
| 6,788,686 B1 | 9/2004 | Khotimsky et al. |
| 6,831,574 B1 | 12/2004 | Mills et al. |
| 6,842,446 B2 | 1/2005 | Everson et al. |
| 6,904,049 B1 | 6/2005 | Maeda |
| 6,963,279 B1 | 11/2005 | Martinelli et al. |
| 6,987,732 B2 | 1/2006 | Gracon et al. |
| 6,999,432 B2 | 2/2006 | Zhang et al. |
| 7,013,354 B1 | 3/2006 | Beck et al. |
| 7,027,415 B1 | 4/2006 | Dahlby et al. |
| 7,039,930 B1 | 5/2006 | Goodman et al. |
| 7,082,221 B1 | 7/2006 | Jiang |
| 7,151,762 B1 | 12/2006 | Ho et al. |
| 7,237,032 B2 | 6/2007 | Gemmell |
| 7,237,033 B2 | 9/2007 | Weigand et al. |
| 7,292,571 B2 | 11/2007 | Brown |
| 7,317,750 B2 | 1/2008 | Shattil |
| 7,324,491 B1 | 1/2008 | Benveniste |
| 7,340,764 B2 | 3/2008 | Kubota et al. |
| 7,542,456 B2 | 6/2009 | Garg et al. |
| 7,551,671 B2 | 6/2009 | Tyldesley et al. |
| 7,738,391 B2 | 6/2010 | Melpignano et al. |
| 7,894,807 B1 | 2/2011 | Drennan |
| 7,948,933 B2 | 5/2011 | Ohayon et al. |
| 8,165,044 B2 | 4/2012 | Mahajan |
| 8,204,085 B1 | 6/2012 | Courtney et al. |
| 8,467,337 B1 | 6/2013 | Ohayon et al. |
| 8,488,659 B2 | 7/2013 | Ohayon et al. |
| 8,649,402 B2 | 2/2014 | Ohayon et al. |
| 8,737,436 B2 | 5/2014 | Ohayon et al. |
| 8,787,966 B2 | 7/2014 | Altman et al. |
| 8,942,179 B2 | 1/2015 | Ohayon et al. |
| 8,964,646 B2 | 2/2015 | Ohayon et al. |
| 9,980,171 B2 * | 5/2018 | Stein .................... G06F 1/1632 |
| 2002/0040479 A1 | 4/2002 | Ehrman et al. |
| 2002/0054578 A1 | 5/2002 | Zhang et al. |
| 2002/0071393 A1 | 6/2002 | Musoll |
| 2002/0143565 A1 | 10/2002 | Headings et al. |
| 2002/0146232 A1 | 10/2002 | Harradine et al. |
| 2002/0154703 A1 | 10/2002 | Kubota et al. |
| 2002/0174434 A1 | 11/2002 | Lee et al. |
| 2002/0176482 A1 | 11/2002 | Chien |
| 2003/0002577 A1 | 1/2003 | Pinder |
| 2003/0009717 A1 | 1/2003 | Fukushima et al. |
| 2003/0016770 A1 | 1/2003 | Trans et al. |
| 2003/0046708 A1 | 3/2003 | Jutzi |
| 2003/0051041 A1 | 3/2003 | Kalavade et al. |
| 2003/0055971 A1 | 3/2003 | Menon |
| 2003/0061503 A1 | 3/2003 | Katz et al. |
| 2003/0074554 A1 | 4/2003 | Roach et al. |
| 2003/0146940 A1 | 8/2003 | Ellis et al. |
| 2003/0159143 A1 | 8/2003 | Chan |
| 2003/0174733 A1 | 9/2003 | Kawai et al. |
| 2004/0013192 A1 | 1/2004 | Kennedy |
| 2004/0023652 A1 | 2/2004 | Shah et al. |
| 2004/0025186 A1 | 2/2004 | Jennings et al. |
| 2004/0088634 A1 | 5/2004 | Kim et al. |
| 2004/0098748 A1 | 5/2004 | Bo et al. |
| 2004/0133907 A1 | 7/2004 | Rodriquez et al. |
| 2004/0133917 A1 | 7/2004 | Schilling |
| 2004/0135879 A1 | 7/2004 | Stacy et al. |
| 2004/0177155 A1 | 9/2004 | Enokida et al. |
| 2004/0180696 A1 | 9/2004 | Foore et al. |
| 2005/0034155 A1 | 2/2005 | Gordon et al. |
| 2005/0035368 A1 | 2/2005 | Bunyk |
| 2005/0041586 A1 | 2/2005 | Jiang |
| 2005/0047363 A1 | 3/2005 | Jiang |
| 2005/0105815 A1 | 5/2005 | Zhang et al. |
| 2005/0122914 A1 | 6/2005 | Durso et al. |
| 2005/0125670 A1 | 6/2005 | Sozzani et al. |
| 2005/0163093 A1 | 7/2005 | Garg et al. |
| 2005/0183109 A1 | 8/2005 | Basson et al. |
| 2005/0265383 A1 | 12/2005 | Melpignano et al. |
| 2005/0280398 A1 * | 12/2005 | Lee ..................... H01R 31/065 320/134 |
| 2006/0015637 A1 | 1/2006 | Chung |
| 2006/0015917 A1 | 1/2006 | Rozental |
| 2006/0015924 A1 | 1/2006 | Kortum et al. |
| 2006/0062242 A1 | 3/2006 | Dacosta |
| 2006/0062243 A1 | 3/2006 | Dacosta |
| 2006/0085551 A1 | 4/2006 | Xie et al. |
| 2006/0088092 A1 | 4/2006 | Chen et al. |
| 2006/0105722 A1 * | 5/2006 | Kumar .................. G06F 1/1632 455/90.3 |
| 2006/0146831 A1 | 7/2006 | Argyropoulos et al. |
| 2006/0221846 A1 | 10/2006 | Dyck et al. |
| 2006/0264184 A1 | 11/2006 | Li et al. |
| 2006/0274773 A1 | 12/2006 | Cohen et al. |
| 2007/0064811 A1 | 3/2007 | Zador et al. |
| 2007/0064949 A1 | 3/2007 | Choi et al. |
| 2007/0083899 A1 | 4/2007 | Compton et al. |
| 2007/0098007 A1 | 5/2007 | Prodan et al. |
| 2007/0121678 A1 | 5/2007 | Brooks et al. |
| 2007/0124773 A1 | 5/2007 | Morris |
| 2007/0136777 A1 | 6/2007 | Hasek et al. |
| 2007/0140455 A1 | 6/2007 | Zhao |
| 2007/0171928 A1 | 7/2007 | Kim et al. |
| 2007/0183452 A1 | 8/2007 | Hryszko et al. |
| 2007/0204321 A1 | 8/2007 | Shen et al. |
| 2007/0207832 A1 | 9/2007 | Gerardi et al. |
| 2007/0230475 A1 | 10/2007 | Langner |
| 2007/0236180 A1 * | 10/2007 | Rodgers ................. H02J 7/342 320/115 |
| 2007/0247515 A1 | 10/2007 | Roman |
| 2007/0263072 A1 | 11/2007 | Lochbaum et al. |
| 2007/0268876 A1 | 11/2007 | Yellin et al. |
| 2008/0025210 A1 | 1/2008 | Honary et al. |
| 2008/0034396 A1 | 2/2008 | Lev |

(56) References Cited

U.S. PATENT DOCUMENTS

| | | |
|---|---|---|
| 2008/0049723 A1 | 2/2008 | Bill et al. |
| 2008/0120676 A1 | 5/2008 | Morad et al. |
| 2008/0247745 A1* | 10/2008 | Nilsson .................. H04N 5/232 396/322 |
| 2008/0295159 A1 | 11/2008 | Sentinelli |
| 2008/0310371 A1 | 12/2008 | Russell |
| 2009/0006848 A1 | 1/2009 | Adrangi et al. |
| 2009/0138925 A1 | 5/2009 | Headings et al. |
| 2009/0163175 A1 | 6/2009 | Shi et al. |
| 2009/0168701 A1 | 7/2009 | White et al. |
| 2009/0249421 A1 | 10/2009 | Liu et al. |
| 2009/0270129 A1 | 10/2009 | Kuo et al. |
| 2010/0045791 A1 | 2/2010 | Drive et al. |
| 2010/0103820 A1 | 4/2010 | Fuller et al. |
| 2010/0210304 A1 | 8/2010 | Huslak |
| 2010/0227588 A1 | 9/2010 | Bradley |
| 2010/0248690 A1 | 9/2010 | Biggs et al. |
| 2010/0273424 A1 | 10/2010 | De Petris et al. |
| 2010/0311391 A1 | 12/2010 | Siu et al. |
| 2010/0311402 A1 | 12/2010 | Srinivasan |
| 2010/0311468 A1 | 12/2010 | Shi et al. |
| 2010/0322259 A1 | 12/2010 | Garg et al. |
| 2011/0007693 A1 | 1/2011 | Frusina et al. |
| 2011/0028135 A1 | 2/2011 | Srinivasan |
| 2011/0051642 A1 | 3/2011 | Krishnaswamy |
| 2011/0059773 A1 | 3/2011 | Neumann et al. |
| 2011/0081951 A1 | 4/2011 | Hwang |
| 2011/0115976 A1 | 5/2011 | Ohayon |
| 2011/0117909 A1 | 5/2011 | Cao et al. |
| 2011/0151858 A1 | 6/2011 | Lai |
| 2011/0154460 A1 | 6/2011 | Khare et al. |
| 2011/0206013 A1 | 8/2011 | Aramoto et al. |
| 2011/0269456 A1 | 11/2011 | Krishnaswamy et al. |
| 2012/0021744 A1 | 1/2012 | Chin et al. |
| 2012/0055231 A1 | 3/2012 | Odendall |
| 2012/0082146 A1 | 4/2012 | Andreasen et al. |
| 2012/0135715 A1 | 5/2012 | Kang et al. |
| 2012/0195259 A1 | 8/2012 | Ohayon et al. |
| 2012/0219085 A1 | 8/2012 | Long et al. |
| 2013/0029720 A1 | 1/2013 | Clevorn |
| 2013/0094522 A1 | 4/2013 | Moshfeghi |
| 2013/0142095 A1 | 6/2013 | Calcev et al. |
| 2013/0155231 A1 | 6/2013 | Ohayon et al. |
| 2013/0329639 A1 | 12/2013 | Wietfeldt et al. |
| 2014/0082697 A1 | 3/2014 | Watfa et al. |
| 2014/0269553 A1* | 9/2014 | Stein .................. H04M 1/72527 370/329 |
| 2014/0355446 A1 | 12/2014 | Altman |
| 2015/0124752 A1 | 5/2015 | Ohayon et al. |

FOREIGN PATENT DOCUMENTS

| | | |
|---|---|---|
| GB | 2428529 | 1/2007 |
| JP | H1-041954 | 2/1998 |
| JP | 2000-216815 | 8/2000 |
| JP | 2000-333231 | 11/2000 |
| JP | 2002-010332 | 1/2002 |
| JP | 2002-152310 | 5/2002 |
| JP | 2002-344965 | 11/2002 |
| JP | 2003-152787 | 5/2003 |
| JP | 2005-065207 | 3/2005 |
| JP | 2005-341310 | 12/2005 |
| JP | 2014-030235 | 2/2014 |
| WO | WO-2002-063501 | 8/2002 |
| WO | WO-2002-089519 | 11/2002 |
| WO | WO-2003-098850 | 11/2003 |
| WO | WO-2005-055524 | 6/2005 |
| WO | WO-2005-060300 | 6/2005 |
| WO | WO-2005-109789 | 11/2005 |
| WO | WO-2009-093252 | 7/2009 |
| WO | WO-2011-075739 | 6/2011 |
| WO | WO-2011-101709 | 8/2011 |
| WO | WO-2012-158850 | 11/2012 |
| WO | WO-2013-171648 | 11/2013 |
| WO | WO-2013-186663 | 12/2013 |

OTHER PUBLICATIONS

International Application PCT/IB2013/054551 Search Report dated Oct. 14, 2013.
Cisco Systems Inc., "Multilink PPP for DDR—Basic Configuration and Verification," Document ID: 10239, Sep. 9, 2005 (9 pp.).
Conant, G.E., "Multilink PPP: One Big Virtual WAN Pipe," Published on Linux Journal (http://www.linuxjournal.com), Sep. 1, 1999 (6 pp.).
Dejero, "Dejero Transforms Live Newsgathering," Jun. 7, 2010 (6 pp.).
European Patent Application No. 09704224.6 Official Action dated Nov. 17, 2011.
European Patent Application No. 12196907.5 Search Report dated Apr. 3, 2013.
European Patent Application No. 09704224.6 Office Action dated Feb. 3, 2014.
European Patent Application No. 137292421 Search Report dated Apr. 13, 2015.
European Patent Application No. 09704224.6 Official Action dated May 8, 2015.
JP Application No. 2013-191799 Office Action dated Apr. 30, 2014.
PCWorld, "Do Web Accelerators Work," Jan. 27, 1999 (4 pp.).
Sklower et al., The PPP Multilink Protocol (MP), RFC 1990, Network Working Group, Aug. 1996 (22 pp.).
Smith, K., "Ascend's Multilink Protocol Plus (MP+)," RFC 1934, Network Working Group, Apr. 1996 (48 pp.).
TVU Networks, "Sharp, glitch-free picture quality from a compact video news gathering backpack," May 6, 2011 (4 pp.).
U.S. Appl. No. 12/965,879 Office Action dated Aug. 29, 2013.
U.S. Appl. No. 13/368,369 Office Action dated Aug. 29, 2013.
U.S. Appl. No. 13/713,001 Office Action dated Apr. 29, 2015.
U.S. Appl. No. 13/886,050 Office Action dated Aug. 12, 2013.
U.S. Appl. No. 13/921,227 Office Action dated Sep. 30, 2013.
U.S. Appl. No. 13/921,227 Office Action dated Feb. 21, 2014.
U.S. Appl. No. 14/588,939 Office Action dated Jul. 16, 2015.

* cited by examiner

APPARATUS FOR COOPERATING WITH A MOBILE DEVICE

PRIORITY CLAIM

This application is a continuation of and claims priority from U.S. patent application Ser. No. 15/091,090, filed Apr. 5, 2016, which is a continuation-in-part of U.S. patent application Ser. No. 14/199,324, filed Mar. 6, 2014 (now U.S. Pat. No. 9,338,650), which claims priority under 35 U.S.C. § 119 to U.S. Provisional Application No. 61/784,630 filed on Mar. 14, 2013. U.S. patent application Ser. No. 15/091,090 is also a continuation-in-part of and claims priority to U.S. patent application Ser. No. 14/292,234, filed May 30, 2014 (now U.S. Pat. No. 9,369,921), which claims priority under 35 U.S.C. § 119 to U.S. Provisional Application No. 61/829,389, filed on May 31, 2013, all of which are incorporated herein by reference.

TECHNICAL FIELD

The disclosed embodiments relate generally to an apparatus and method for transmitting a data stream, and more particularly but not exclusively for transmitting a data stream using several transceivers.

BACKGROUND

Many mobile devices operating on standard communication networks, such as cellular networks and WiFi networks, are limited in the areas in which they have coverage from their network operator and in their download/upload rate. In addition, even in areas that the mobile device has good service, a typical uploading rate for the mobile device in cellular networks and/or WiFi networks may not be sufficient for transmitting a video stream at a desired quality in close to real time.

SUMMARY

One embodiment of the disclosure may include an apparatus for cooperating with a mobile device having an embedded transceiver. The apparatus may include a housing, a mechanical connector configured to mechanically retain the mobile device, and at least one port within the housing for conveying energy to at least one auxiliary wireless transceiver associable with the apparatus, wherein the apparatus is configured to cooperate with the mobile device when the mobile device is retained on the housing by the mechanical connector, to enable transmission of a first portion of a data stream over the at least one auxiliary transceiver while a second portion of the data stream is simultaneously transmitted over the embedded transceiver.

Other aspects of the disclosure are set forth in the description which follows and are included in the appended claims, the entirety of which is incorporated into this Summary by reference.

BRIEF DESCRIPTION OF THE DRAWINGS

For a more complete understanding of the disclosure, reference is now made to the following detailed description taken in conjunction with the accompanying drawings wherein.

DETAILED DESCRIPTION

Figure 1:
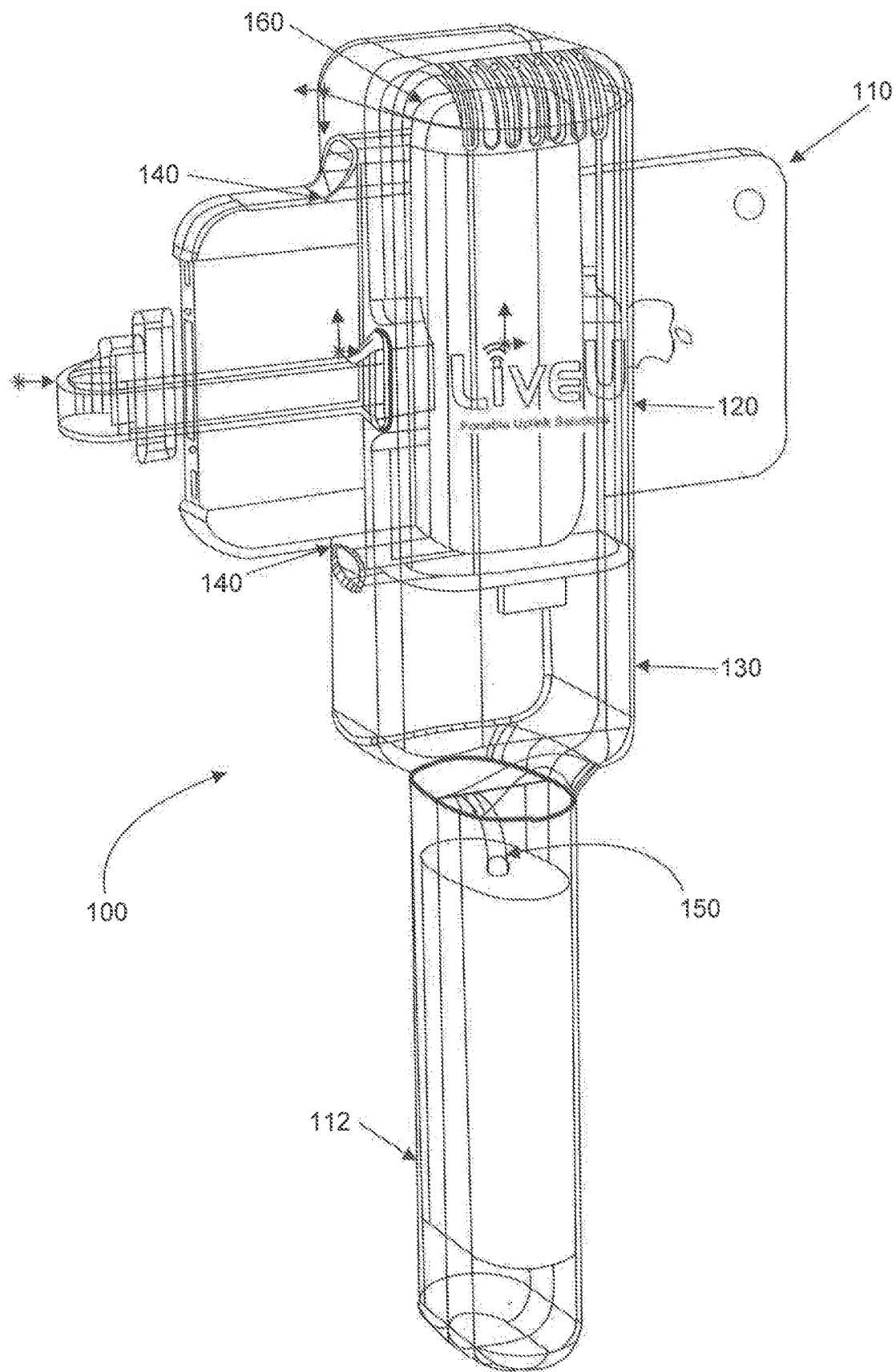
FIG. 1 is a diagrammatic representation of an exemplary apparatus according to some disclosed embodiments of the invention.

The following detailed description is provided by way of example and not intended to limit the scope of the invention in any way. Specific details in the described embodiments and exemplary apparatuses are set forth in order to provide a thorough understanding of the embodiments and the exemplary apparatuses. It should be apparent, however, that not all details are required in all embodiments of the invention. The scope of some embodiments of the invention are demarcated by the appended claims.

Devices consistent with this disclosure may have multiple uses, one of which may be to aid in real time streaming of live video via a mobile device such as a cell phone. In some instances, it may be difficult to transmit live video in real time or near real time, at a desired quality level and with a desired reliability. The mobile device may be retained within an apparatus having a handle. In one embodiment, the apparatus may include one or more auxiliary transmitters configured to receive portions of a video stream captured by a camera of the mobile device. Alternatively, the apparatus may be configured to receive a data stream, for example a video stream, an audio stream, or a media stream, from external devices, such as an external camera, recorder, telematics, monitors, medical devices, imaging devices, or other equipment.

In some embodiments, the apparatus may be configured to receive the data stream over wireless connection, such as, WiFi, Bluetooth, Wireless USB, Wireless High-Definition Multimedia Interface (HDMI), Coded Orthogonal Frequency Division Multiplexing (COFDM), etc. Alternatively, the apparatus may be configured to receive the data stream over a wired connection, such as, HDMI connection, Serial digital interface (SDI) connection, a standard camera connection, a USB connection, a proprietary connection, an Ethernet connection, etc. The data stream received from one or more sources, may be transmitted on its own, or combined with other data produced by the mobile device itself. For example, a portion of the video stream may be transmitted directly over a cellular network by the mobile device, and one or more additional portions of the video stream may be sent to the apparatus, and transmitted over other wireless channels, e.g., WiFi, a second cellular network, etc. All of these portions may be transmitted in a manner that permits the video to be reconstructed at a receiving location.

To power one or more transceivers within the apparatus, the apparatus may contain a battery. The battery may also provide auxiliary power to the mobile device. A mechanical connector may reliably secure the mobile device to the apparatus, and a handle may be provided to facilitate stable capture of video. In other words, handle may be configured to permit a user to simultaneously stabilize the housing and the camera of the mobile device. Depending on specific construction, a user holding the handle of apparatus may be able to transmit live HD video (or increased quality video) by splitting the video signal across multiple channels. The mobile battery may provide power for both the auxiliary transceivers and the mobile device, thereby increasing reliability. When the broadcast is complete, the user may remove the mobile device from its secure seat in apparatus and resume using the mobile device according to its customary usage.

FIG. 1 is a diagrammatic representation of an exemplary apparatus (100) cooperating with a mobile device (e.g., cell phone 110) having an embedded transceiver (120) according to some embodiments. Apparatus 100 may include a holding mechanism (e.g., handle 112), a housing (130), a mechanical connector (140) for mechanically retain cell phone 110, and at least one port (150) for conveying energy to at least one auxiliary wireless transceiver (160) associable with the apparatus. When cell phone 110 is retained on housing 130 by mechanical connector 140, apparatus 100 enables transmission of a first portion of a data stream over at least one auxiliary transceiver 160 while, a second portion of the data stream is simultaneously transmitted over embedded transceiver 120.

In some embodiments an apparatus is provided for cooperating with a mobile device having an embedded transceiver. The term "mobile device" as used herein refers to any device configured to communicate with a wireless network, including, but not limited to a smartphone, tablet, mobile station, user equipment (UE), personal digital assistant, laptop, public safety Land Mobile Radio (LMR) terminals, e-Readers, dedicated terminals and any other device that enables mobile data communication. The term "transceiver" as used herein refers to any device capable of transmitting and/or receiving signals in a wireless network. For example, a transceiver can communicate with a cellular network, mobile telephony network, IP network, and even with mesh devices or peer-to-peer devices. While the invention, in its broadest sense, is not limited to any particular transceiver or communications protocol, embodiments of the invention may employ a transceiver that uses one or more of the following exemplary communication standards: GSM, GPRS, HSPA, Edge, LTE, LTE Advanced, HSPA, CDMA, CDMA Rev A, CDMA Rev B, WiMAX, WiFi, Bluetooth, COFDM, Wibro, Satellite BGAN, and satellite VSAT. Alternatively, embodiments of the invention may involve transceivers that use other known or future wireless protocols.

According to some embodiments consistent with the present disclosure, a data stream (e.g., a video stream) originating from a mobile device may be transmitted by at least two transceivers. The first transceiver may be a transceiver embedded in the mobile device, meaning a transceiver that is built into the mobile device itself (e.g., a cellular transceiver or a WiFi transceiver). The other at least one transceiver can be an auxiliary wireless transceiver associated with a separate apparatus (e.g., a cellular transceiver and a satellite transceiver). The term "auxiliary wireless transceiver" may refer to any transceiver associable with an apparatus, separate from the mobile device, other than any embedded transceiver of the mobile device. According to some embodiments, the auxiliary wireless transceiver can be a single-chip transceiver built into an apparatus for holding the wireless device, or in the alternative, the auxiliary wireless transceiver can be part of a stand-alone unit (e.g., a USB modem) that may be associated with the apparatus for holding the wireless device.

In some embodiments the apparatus includes a mechanical connector on the housing to mechanically retain the mobile device. As used herein, the term "mechanical connector", refers to any structure configured to hold a mobile device, and the term "housing" refers to any structure that provides support to the mechanical connector. Depending on design choice, the mechanical connector and the housing may be constructed of separate pieces or may be integrally formed. Mechanically retaining the mobile device means that the mechanical connector can maintain the mobile device (230) in a supported orientation. In some embodiments the mechanical connector can mechanically retain the mobile device without blocking or obstructing the field of view of its camera, and without interfering with some or all functions of the mobile device, e.g., front camera, back camera, touch screen, buttons, connector ports, etc. In order to retain the mobile device, the mechanical connector may use one or more of the following: a mount, an attaching member, a support surface, a holding arm, a jaw, a friction fit, a clamp, a clip, a suction cup, an adjustable frame, a locking mechanism or any combination thereof. One example of a housing and a mechanical connector is provided in FIG. 2.

Figure 2:
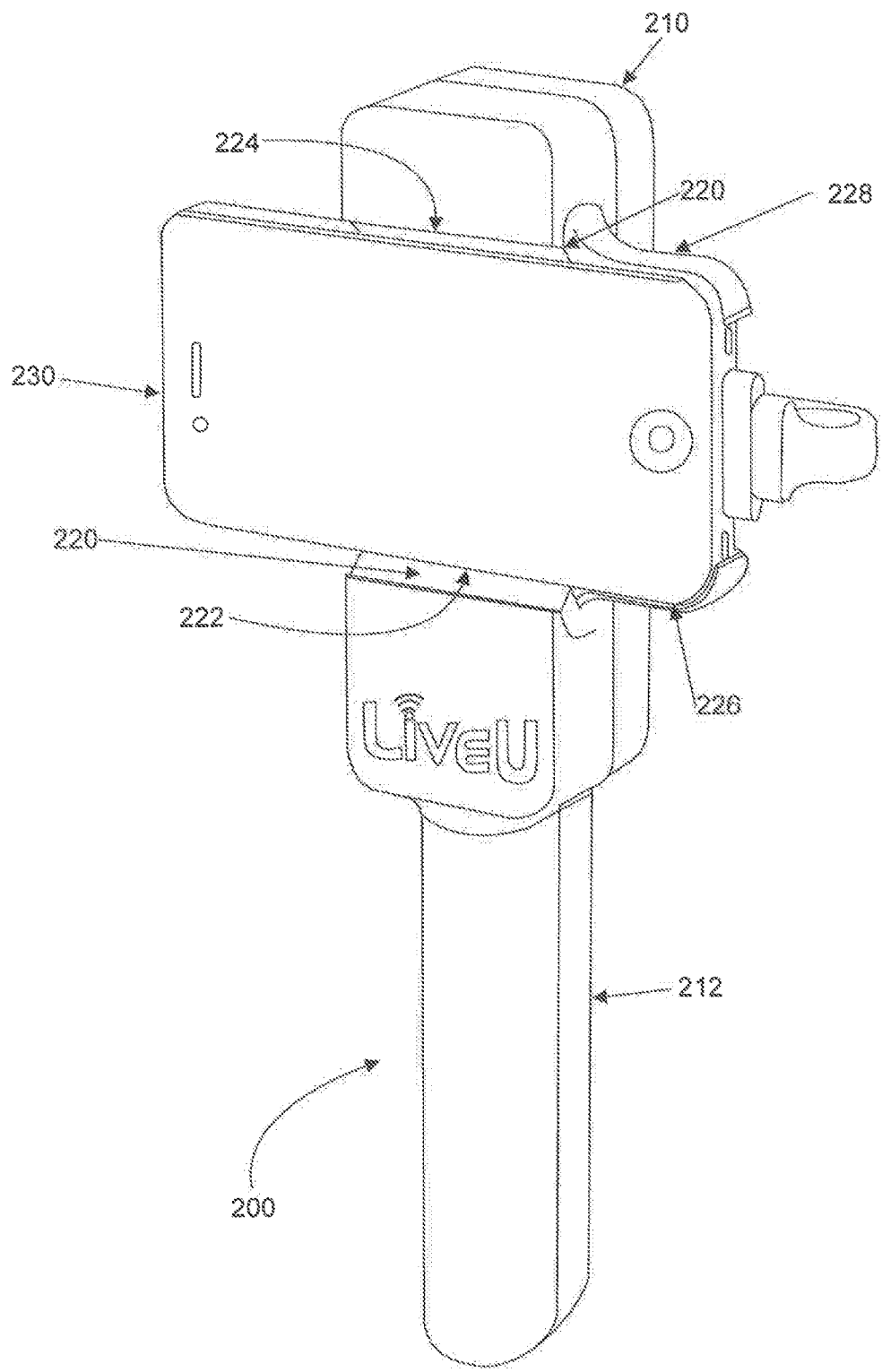
FIG. 2 is another diagrammatic representation of the exemplary apparatus according to some disclosed embodiments of the invention.

FIG. 2 is a diagrammatic representation illustrating an apparatus (200) that includes a housing (210) and a mechanical connector (220). In this example, housing 210 includes a holding mechanism (e.g. handle 212) for enabling a user to steadily direct the camera of the mobile device during data transmission. Housing 210 is coupled with mechanical connector 220 having two adjustable support surfaces (222 and 224) and two arms (226 and 228). Even with this embodiment, the arms may be omitted or additional arms or other securing elements may be added. The capability of rigidly fixing the image plane of mobile device 230, especially during the image capture, assists in outputting stable video stream and avoiding capturing blurry images. Arms 226 and 228 can be designed for detachably gripping a periphery of mobile device 230, for example arms 226 and 228 can be curved at their ends. Mechanical connector 220 can be constituted of a resilient material, such as synthetic plastic or metal, that yield to enable mobile device 230 to be snap-fitted to the mechanical connector. Alternatively, adjustable support surfaces 222 and 224 may be constructed in a jaw arrangement to permit those opposing surfaces to clamp onto the mobile device 230.

In addition, mechanical connector 220 can be configured such that the embedded transceiver in mobile device 230 and at least one auxiliary wireless transceiver associable with apparatus 200 are maintainable at a fixed distance from each other. For example, the embedded transceiver and an auxiliary wireless transceiver may be maintained (as long as mobile device 230 is retained by mechanical connector 220)

at any fixed and predetermined distance between 1 inch and 10 inches, for example, in some embodiments mechanical connector 220 may be customized to hold a single type and model of the mobile device 230 (e.g., Samsung Galaxy S3™, IPhone™, IPad™). Alternatively, mechanical connector 220 can be adapted to be adjustable and to hold selectively hold a plurality of a differing mobile device 230 and/or differing models of a same mobile device.

As used herein, the term "holding mechanism" refers to any element constructed to be grasped or held by one or more hands of a user (e.g., a handle, a grip). As illustrated in FIGS. 1 and 2, handle 112 and 212 may have an elongated rod-like shape. However, the invention in its broadest sense is not so limited. A holding mechanism may be rounded with or without an opening in a center thereof; c-shaped, L-shaped, T-shaped, or may include any other shape that permits holding by a user. While the figures illustrate rigid holding mechanisms, holding mechanisms consistent with the disclosure may include flexible structures such as straps, bands or any other flexible structure that permits the apparatus to be reliably held in one or more hands of a user. Collectively, all of these various types of holding mechanisms may be referred to as a handle.

Handle 212 can be provided with an insert (not shown in the figures) having an internally threaded passage for threaded engagement with an industry standard threaded mounting stud to enable the apparatus 200 to be readily mounted on industry standard camera and video equipment mounting platforms, such as tripods. Apparatus 200 can further include a vehicle dashboard mount, part of the holding mechanism or separately, enabling the apparatus to be used remotely from the user of the mobile device. The apparatus may also include means to support remote wired and/or wireless control of itself and of the mobile device. According to some embodiments, the dimensions of apparatus 200 may enable it to be carried inside a handbag. For example, the length of the apparatus 200 can be less than 12 inches, and the weight of the apparatus can be less than 2 Kg. The materials and components of apparatus 200 may enhance Radio Frequency (RF) performance of the embedded transceiver and, may facilitate heat dissipation, and provide additional protection to mobile device and against diverse environmental conditions (such as shocks, vibration, humidity, dust, heat, cold, etc.) Heat dissipation may occur by constructing the housing 210 as a heat sync, or by including venting in the housing or in spaces around the holding area for air passage.

In some embodiments the apparatus includes at least one port in the housing for conveying energy. The term "port" as used herein refers to an interface between a power source and circuitry of the apparatus. The port can be a permanent interface between the power source and the circuitry of the apparatus, or a temporary interface e.g., the port may be associated with the power source. For example, in some embodiments where the battery is removable, the port may include a battery connector having contacts for engaging contacts on the battery when the battery is installed. Alternatively, the port may be a permanent wired connection between the battery and internal circuitry of the apparatus.

The port can be used for conveying energy from the power source to the at least one auxiliary wireless transceiver. In addition, the port can be used for conveying energy from the power source to the mobile device. Consistent with embodiments of the present disclosure, energy conveyance may be direct or indirect. Direct conveyance occurs when the power source is directly connected to component to be powered a transceiver). Indirect conveyance may occur when power is transmitted via intermediate components or circuitry. Both qualify as "conveying energy" within the meaning of this disclosure. If the port is used for conveying energy to the mobile device, the apparatus can include an electrical connector for enabling power transmission from the port to the mobile device. The electrical connector may include any conductive cable, e.g., the electrical connector may be connected directly to the port or connected indirectly through circuitry of the apparatus.

The term "circuitry" as used herein refers to all of the following: (a) hardware-only circuit implementations, such as implementations in only analog and/or digital circuitry (e.g., wires, electric connection), and (b) combinations of circuits, software and/or firmware (e.g., a combination of processors, digital signal processors, software, and memories that work together to cause an apparatus to perform various functions), and (c) circuits (e.g., a microprocessor or a portion of a microprocessor, that require software or firmware for operation, even if the software or firmware is not physically present). The power source connectable to the port can be an external power supply (e.g., a regular AC power supply, a DC vehicle power supply). Alternatively, the power source may be battery located within the housing connectable directly or indirectly to the port (e.g., a rechargeable battery). The term "battery" as used herein broadly refers to any device that can repeatedly store and dispense electric power, including but not limited to chemical batteries (e.g., a lead-acid battery, a lithium ion battery, a nickel-metal hydride battery, a nickel-cadmium battery). In case the apparatus is powered directly by a vehicle power supply, the apparatus may contain electronic components to regulate and stabilize incoming spiky and unstable DC power supply such as comes directly from 12 VDC vehicle power supply, in case the apparatus is powered by a battery, the apparatus may be configured to extend operation time of the mobile device by at least 30 minutes (e.g., one hour or two hours) of continuous video transmission.

Figure 3:
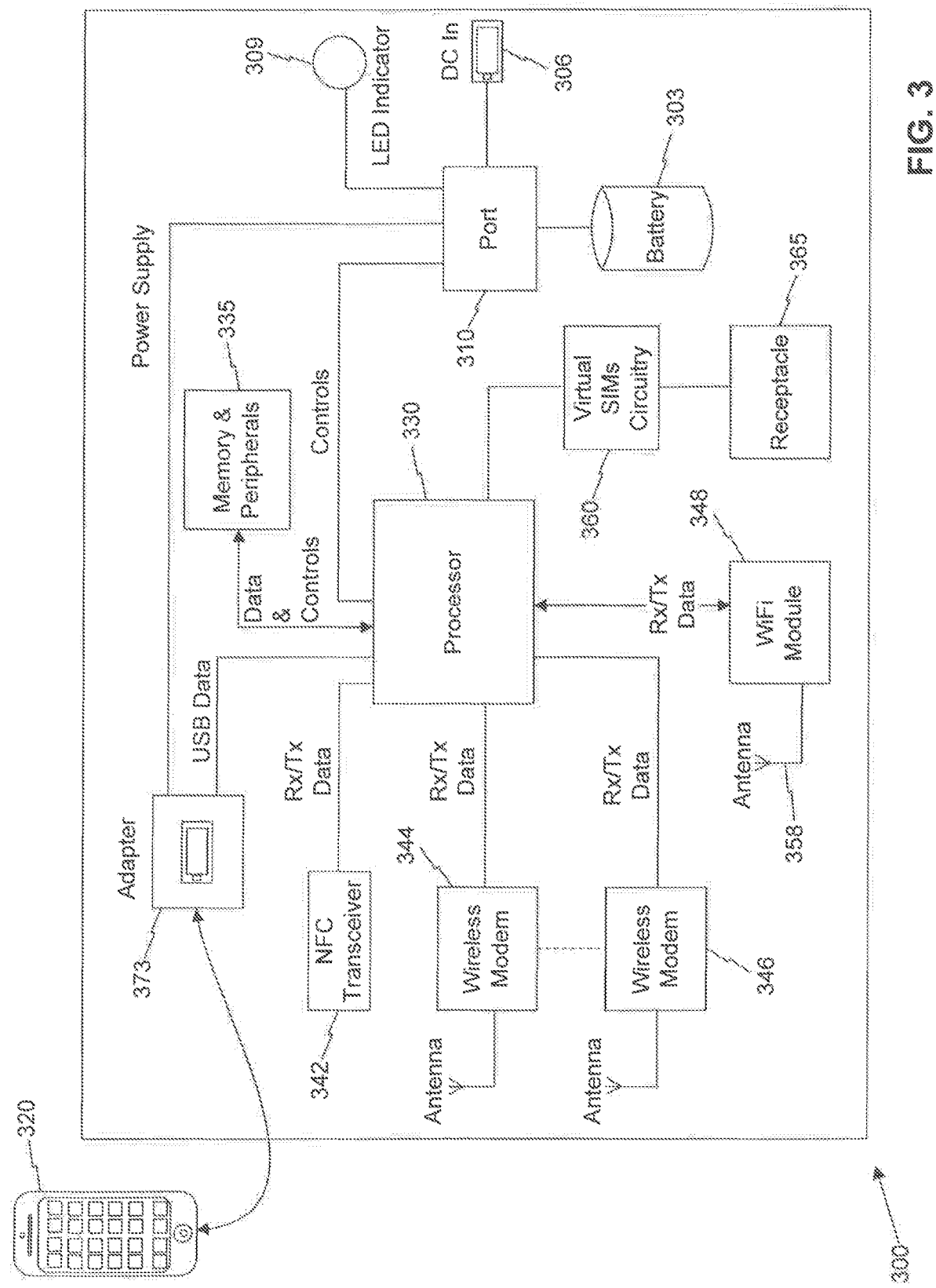
FIG. 3 is a block diagram that illustrates the circuitry of an exemplary apparatus according to some embodiments of the invention.

FIG. 3 is a block diagram illustrating circuitry of an exemplary apparatus (300) according to some embodiments. Apparatus 300 can be powered by a battery (303) and/or an external power source (306), both of which are connectable to a port (310), which might simply be a hardwire, or might include a selective connector. In case battery 303 is a rechargeable battery, external power source 306 may be used to recharge battery 303. A light-emitting diode (LED) indicator (309), such as bi-color LED, may indicate that the battery is charged, or that external power source 306 is plugged in. The energy from battery 303 and/or external power source 306 can be conveyed to an electrical connector (316) connected via an adapter (313) to power/charge a mobile device (320). Electrical connector 316 may also be used for exchanging of information between mobile, device 320 and at least one processor. In a different configuration, electrical connector 316 may be connected to a communication port associated with the housing (not shown in FIG. 3). For example, electrical connector 316 may be a USB cable that supports data-transfer rates of 480 Mbps to transmit a data stream and used to charge mobile device 320.

In some embodiments, apparatus 300 includes at least one processor (e.g., processor 330). The term "processor" as used herein refers to any physical device having an electric circuit that performs a logic operation on input or inputs. For example, processor 330 may include one or more integrated circuits, microchips, microcontrollers microprocessors, all or part of a central processing unit (CPU), graphics processing unit (GPU), digital signal processor (DSP), field-programmable gate array (FPGA) or other circuits suitable for executing instructions or performing logic operations. Processor 330 may be configured to communicate with the mobile device and other electronic components (e.g., a transceiver) within the apparatus and to control at least one of the components of the apparatus. The instructions executed by processor 330 may be pre-loaded into a memory unit integrated with embedded into processor 330, or stored in a separate memory unit (335) having an erasable and non-erasable memory banks, such as a RAM, a ROM, or a hard disk. In the alternative, the instructions executed by processor 330 may be received from mobile device 320, mobile device 320 or an application pre-installed on the mobile device can control the operation of the processor 330 by sending processor 330 instructions via one of the apparatus' auxiliary wireless transceivers or via electrical connector 316. Some of the logic operations processor 330 may be configured to preform are: local circuitry management, handshake with mobile device 320 over the wired and wireless links, a user authentication, data encryption/decryption, virtual SIMs implementation, battery charging control, battery status report via LED indicator 309, power management, processing of connectivity detection, auxiliary wireless transceivers management, auxiliary wireless transceivers connectivity management (with their respective networks), user interface management, and audio processing such as digitization. While, for ease of illustration, FIG. 3 illustrates a single processor, it should be understood that, consistent with embodiments of the invention, functionality may occur in a single processor or may be split among multiple processors.

In the example illustrated in FIG. 3, processor 330 is connected to four transceivers (342, 344, 346, and 348). Transceiver 342 may be a Near Field Communication (NFC) transceiver dedicated to communicating with mobile device 320. For example, transceiver 342 may receive a data stream or a portion of a data stream from mobile device 320. Transceivers 344 and 346 may be cellular transceivers for communicating with at least one cellular network. In one embodiment transceiver 344 communicates with a first cellular network and transceiver 346 communicates with a second different cellular network. The first cellular network and the second cellular network can differ in their technology (e.g., the first cellular network can be a GSM network, and the second cellular network can be an LTE network). Alternately, the first cellular network and the second cellular network can work with the same technology and still be different in their service provider. Transceiver 348 may be a WiFi transceiver for communicating with any device providing Internet access over a wireless local area network. Transceivers 344, 346, and 348 may be respectively associated with antennas (354, 356, and 358).

The term "antenna" as used herein means any radiating element (or multiplicity of radiating elements) that is capable of receiving electromagnetic radiation and generating an electrical signal therefrom. For example, the term "antenna" includes an RF antenna, a multiple-input and multiple-output (IMMO) antenna, an antenna set, an antenna array, a beam forming antenna, a multi-frequency antenna, a multi-band antenna, or any RF device. In one embodiment the term "antenna" include also at least one processing unit that supports the RF connectivity or physical layer connectivity required to establish wireless communication, e.g., cellular, satellite, WiFi, etc. Antennas 354, 356, and 358 may, by way of example only, have a gain of at least −5 dBi, a processing gain of at least −5 dBi, a gain of at least −10 dBi, a processing gain of at least −10 dBi, a gain of at least −15 dBi, or a processing gain of at least −15 dBi. Antennas 354, 356, and 358 may also be used as a performance boosting antenna for mobile device 320 to enhance the communications capabilities and resiliency of mobile device 320. For example, apparatus 300 may provide the user of mobile device 320 the ability to switch between different networks in order to provide the user basic services (such as voice and SMSs), at high availability in areas of limited coverage or service by any one of the networks.

In some embodiments, apparatus 300 may include at least one power regulator (not shown in the FIG. 3). The term "power regulator" includes any device capable of reducing a power usage of at least one device or component. For example, a power regulator can receive at least one control signal from the mobile device and reduce the power usage by the at least one auxiliary transceiver during certain periods. The power regulator may receive a control signal from the mobile device when no data stream or a portion of data stream is received by the apparatus, or when there is no intention to transmit any data stream. Alternatively, the power regulator may be pre-programmed to reduce the power usage by the at least one auxiliary transceiver based on events other than the control signals from the mobile, device (e.g., end of transmission, low performance of transceiver etc.). Apparatus 300 may include at least one peripheral connector (also not shown in the FIG. 3), for enabling connection of apparatus 300 to other devices e.g., via Ethernet, microphones, speakers, Bluetooth transceiver, etc.

In some embodiments, processor 330 may be further connected to a virtual Subscriber Identity Module (SIM) circuitry (360) associated with a receptacle (365) for containing at least one wireless identification card. The term "receptacle" as used herein refers to an object or space used to contain at least one SIM card or any removable memory that functions as a SIM card. While receptacle 365 is illustrated as a single component, it may include multiple components. For example, receptacle 365 may include one or more components configured to hold multiple SIM cards, micro SIM cards, and/or o nano SIM cards. For example, receptacle 365 may enable auxiliary transmission of data over one, two, three, four, five, six, seven, or eight wireless channels. Processor 330 may be configured to receive wireless service/authentication credentials, associated with but not limited to the following standards: USM, RSIM, GSM, WiFi. The wireless service/authentication credentials may be associated with a plurality of different wireless service providers and enable wireless communication depending on the wireless credentials received. The term "credentials" refers to any information that can be stored and functionally used in place of a SIM card. These credentials may be downloaded to the apparatus 300 via any of its auxiliary wireless transceivers (342, 344, 346, and 348) or downloaded to mobile device 320 and transmitted to apparatus 300 using electrical connector 316. Additionally, the downloaded credentials may also be used by mobile device 320 instead of its own credentials, in order to avoid roaming charges. Virtual SIM circuitry 360 may store a plurality of fixed credentials (or regularly download and store temporary credentials) to be used by one of the wireless transceivers.

In other embodiments, processor 330 may be configured to authorize a pairing of a specific mobile device with the apparatus, or authorize a pairing of a pre-defined number of specific mobile devices. The term "pairing" as used herein may mean, for example, that the mobile device and the apparatus have exchanged a protected passkey in order to establish a trusted connection. The authorization of pairing of specific mobile devices may be desired to enable only pre-registered mobile devices usage of apparatus 300. The authorization procedure may include validating authenticating information of mobile devices, for example: specific numbers (serial ID, SIM ID etc.), bonding software ID, and license requirements. In some embodiments the authenticating information may be stored in memory unit 335, in addition, processor 330 may be configured to use the authenticating information to determine if the usage of the apparatus is according to policies and algorithms. Apparatus 300 may also include a user interface (e.g., LED, touchscreen) to control at least one function of the apparatus e.g., to select which auxiliary wireless transceiver to use.

In one embodiment, at least one of the auxiliary wireless transceivers of the apparatus is a transceiver in a dedicated network such as an ad-hoc mesh network or a COFDM network (i.e., not a cellular network). In this embodiment the typical user may include public safety personnel, military personnel, municipality workers, etc. The software running on the mobile device may use both a network associated with its embedded transceiver and a network associated with the auxiliary wireless transceiver. In the alternative, the mobile device may prefer one network over the other, or may switch from one to the other according to availability and coverage, as per various control indications and policies and algorithms. The processor of the apparatus can execute encryption/decryption algorithms and protocols, so that any part of the communication exchanged (transmit/received) over one of the auxiliary wireless transceivers is encrypted/decrypted. The apparatus may enable the user of the mobile device to select between a secure communication and an open communication. By encrypting a part of the communication, an additional security and data protection for any bonded usage, including of voice, may be provided.

Figure 4:
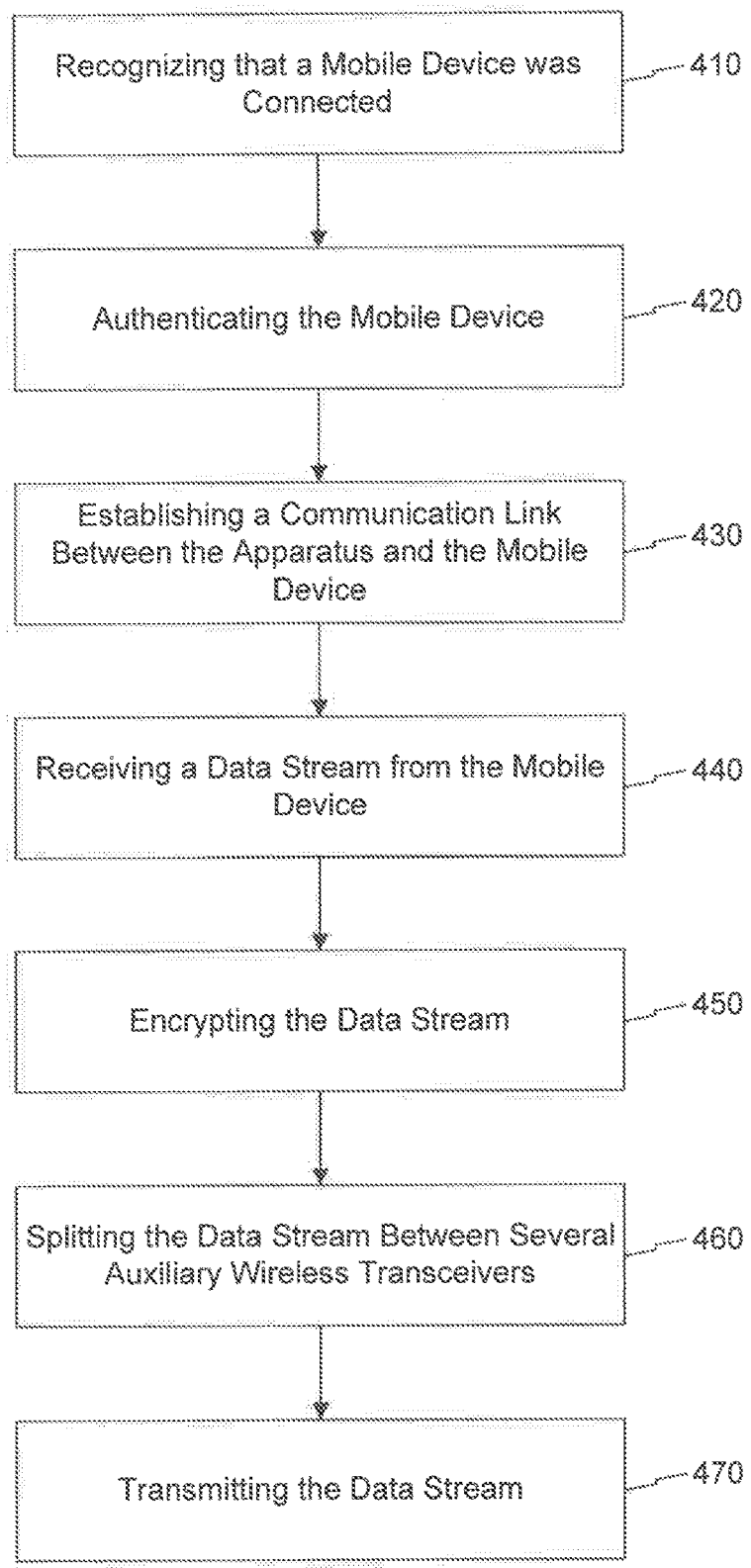
FIG. 4 is a flow chart of an exemplary method for using an apparatus consistent with some embodiments of the invention.

Flow chart 400 in FIG. 4 represents an exemplary method for using an apparatus consistent with some embodiments. Step 410 includes recognizing that a mobile device was connected using any switch known in the art (e.g., a mechanical switch, a piezo electric switch, a photo-electric switch, wireless switch, etc.). According to one embodiment before the mobile device is connected to the apparatus, some or all of the apparatus circuitry can be at power down state. A standby mode may avow minimal power discharge from the power source e.g., embedded battery. The processor may continuously sense the mobile device wired bus activity (even in standby mode). Step 420 is an optional step that includes authenticating the mobile device. The processor may perform an authentication phase for the mobile device, in order to verify that the mobile device is licensed to use the apparatus. The processor may use an NFC path as a part of the authentication phase, and/or as a secondary authentication measure. If such license exists, the processor can power up all circuitry, or power control of all parts of the circuitry as a result of a specific application decision. The power control may include, but is not necessarily limited to:

Turning off some or all the wireless communication links due to either poor coverage or more than enough bandwidth;
Turning off some or all the wireless communication links due to a low battery power condition; and
Turning off/on the apparatus periodically or per a specific event, based on remote manager commands.

The power control and the power save modes can extend the operation time and enable remote controlled operation. This may be useful if the apparatus is powered by a battery. After the optional authentication and upon completion of the boot-up, the processor, along with the other electronic devices, may establish a communication link between the apparatus and the mobile device in step 430. The communication link may wirelessly use one of the auxiliary wireless transceiver (e.g., the NFC transceiver). Alternatively, the communication link may be a physical connection using an electrical connector that may be connected to a communication port. Step 440 includes receiving a data stream from the mobile device. The data stream may be a video stream, a portion of live video stream, a portion of an audio stream, and/or any other data transmission. Step 450 is an optional step, that includes encrypting the data stream. The processor may be configured to encrypt (or decrypt) the data stream before (or after) it is transmitted to (or from) a public network, in order to enhance the transmitted data authenticity, privacy, and security. Step 460 is also an optional step, that includes splitting the data stream between several auxiliary wireless transceivers. In case the apparatus has more than one auxiliary wireless transceiver, the processor may split the data stream (or part of the data stream) between all of a plurality of auxiliary wireless transceivers. Each auxiliary wireless transceiver may be equipped with a specially designed RF antenna in order to improve the wireless network Signal Noise Ratio (SNR), and associated efficiency. In addition, each transceiver can register itself to its network by either using its attached SIM secret key, or by acquiring (with the processor assistance) a virtual SIM with a secret key. Once the wireless network registration has been completed and the transceiver is connected to the public network, the data stream may be transmitted in step 470.

Figure 5:
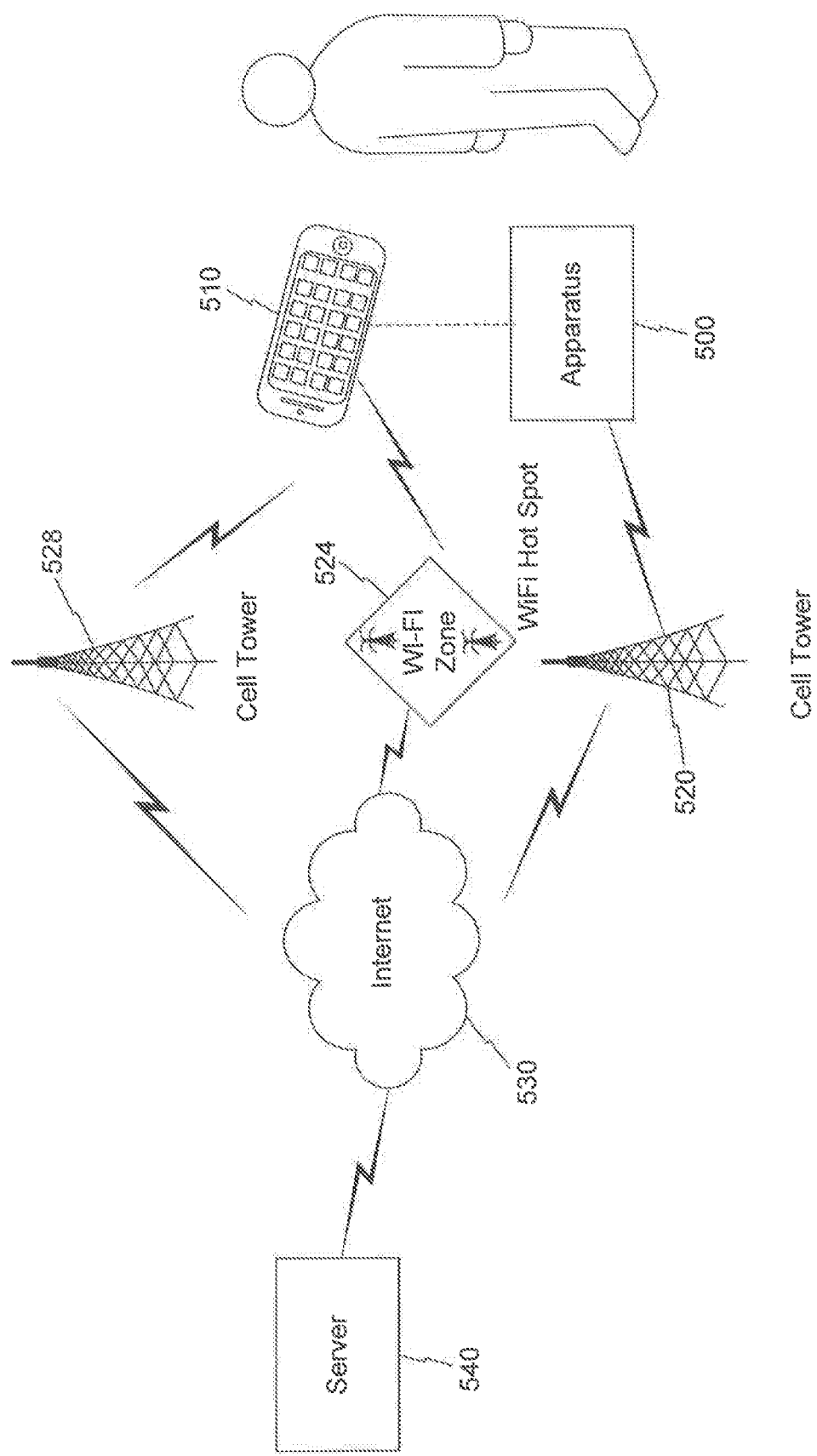
FIG. 5 is a diagrammatic representation which depicts the flow work of an exemplary apparatus according to some embodiments of the invention.

FIG. 5 is a diagrammatic representation illustrating a work flow of an exemplary apparatus according to some embodiments. According to one exemplary embodiment, in order for apparatus 500 to work, mobile device 510 must be retained in apparatus 500 and maintain a fixed distance from the auxiliary wireless transceiver. In an alternative embodiment illustrated in this figure, mobile device 510 can communicate wirelessly with apparatus 500, and the distance between the mobile device and the auxiliary wireless transceiver is changeable. Mobile device 510 can communicate with apparatus 500 with any commercial standard wireless protocol or wired protocol over a commercial standard connector, for example: Wireless Ethernet, WiFi, Bluetooth, Zigbee, WiGig, Wireless Personal Area Network, NFC, USB, HDMI, mobile devices docking connectors, Apple Lightning connector, Apple External Accessory connector protocols such as MFi; Samsung Galaxi Tab connector. In some cases mobile device 610 can communicate with apparatus 500 using a commercial standard wireless protocol even when they are physically connected. Several wireless communication routes may be used simultaneously to transmit a data stream from the mobile device, the difference in the wireless communication routes may result from different wireless transceivers used. The terms simultaneous and simultaneously, as used herein in connection with data transmission, indicates that there is at least some overlap in time when multiple data streams are transmitted. For example, if there is at least a slight overlap in time between when one auxiliary transceiver transmits the first portion and when an embedded transceiver transmits the second portion, those two transmissions are considered "simultaneous". Consistent with this disclosure, mobile device 510 and apparatus 500 may have any type of wireless transceiver, for example: a GSM transceiver, a GPRS transceiver, an HSPA transceiver, an LTE transceiver, an LTE Advanced transceiver, a CDMA transceiver, a CDMA Rev A transceiver, a CDMA Rev B transceiver, a WiMAX transceiver, a WiFi transceiver, a COFDM transceiver, a satellite BGAN transceiver, and a satellite VSAT transceiver.

In some embodiments, a software pre-installed in a mobile device (e.g., LU-Smart mobile app) can instruct at least one processor of the mobile device to split a data stream into several portions, such that each portion will be transmitted concurrently (or substantially concurrently) via differing wireless communication routes. This functionality may be important when the data stream to be transmitted is a live video stream. In the example illustrated in FIG. 5, the processor of the mobile device splits the data stream into three portions and uses the combination of the mobile device embedded transceivers and an auxiliary wireless transceiver as a virtual broadband upload connection. The first portion is transmitted from the at least one auxiliary wireless transceiver of the apparatus via a first cellular network (520). The second portion is concurrently transmitted from a first embedded transceiver of the mobile device via a second cellular network (528). The third portion is concurrently transmitted from a second embedded transceiver of the mobile device (a WiFi transceiver) via a mobile hot spot (524). All three portions of the data stream can be transmitted via the Internet (530) to a bonding server (540) that reconstructs the three portions into one data stream. Apparatus 500 can transmit the first portion of the data stream in a manner enabling the data stream (e.g., a live video stream captured by a camera of the mobile device) to be reconstructed at bonding server 540 from all the portions of the data stream substantially close to real time. Reconstructing the portions into one data stream means that the original data stream is assembled from all the portions and ready for use (e.g., in case the data stream is a video stream the reconstructed video stream can be displayed). In one embodiment the first portion of data stream may include data packets that are also included in the second portions of data stream. The processor of mobile device 510 may inequitably distribute the data stream, such that the first portion may be larger than the second portion. For example, when the performance of the embedded transceiver is less than the combined performance of the auxiliary wireless transceivers, in specific situations (e.g., the embedded transceiver has no reception) all of the portions of the data stream may be transmitted via the auxiliary wireless transceivers. The processor(s) in the apparatus or in the mobile device may be configured to load balance outgoing data streams in order to ensure timely reconstruction at a receiving location.

While the foregoing paragraph describes a three way split of data streams, the split may be two ways or may be more than three ways, depending on the number of additional channels made available through apparatus 500. Each additional SIM card or virtual SIM card provided through apparatus 500 may provide an additional opportunity to split the data stream.

For example, in accordance with some embodiments, apparatus 500 can be configured to retain at least two co-located auxiliary wireless transceivers. In one embodiment (not shown in the figure) apparatus 500 can further split the first portion of the data stream to at least two sub-portions and transmit each sub-portion via a different wireless communication route. For example, apparatus 500 can have two auxiliary wireless transceivers, and the processor of apparatus 500 can split the first portion of the data stream received from mobile device 510 to two sub-portions, in one instance, the at least one processor is configured to distribute the first sub-portion and the second sub-portion in a manner permitting reconstruction of the data stream (e.g., the live video stream) at a receiver (e.g., a bonding server 540) when the first sub-portion is distributed to the receiver via a satellite communication network, and the second sub-portion is distributed to the receiver via a cellular communication network. In another instance, the first sub-portion is distributed to the receiver via a first cellular communication network and the second sub-portion is distributed to the receiver via a second cellular communication network. According to some embodiments, the at least one processor is further configured to inequitably distribute the first sub-portion to the first auxiliary wireless transceiver and second plurality of packets to the second auxiliary wireless transceiver. In this situation, more data packets may be transmitted via the first wireless communication route than via the second wireless communication route. An example of when the at least one processor may inequitably distribute the sub-portions is when the at least one performance factor of the first wireless communication route is higher than the at least one performance factor of the second wireless communication route. The at least one performance factor can be: bandwidth, modem speed, modem reliability, operating license limitations, network congestion, modem error rate and connection quality.

Figure 6:
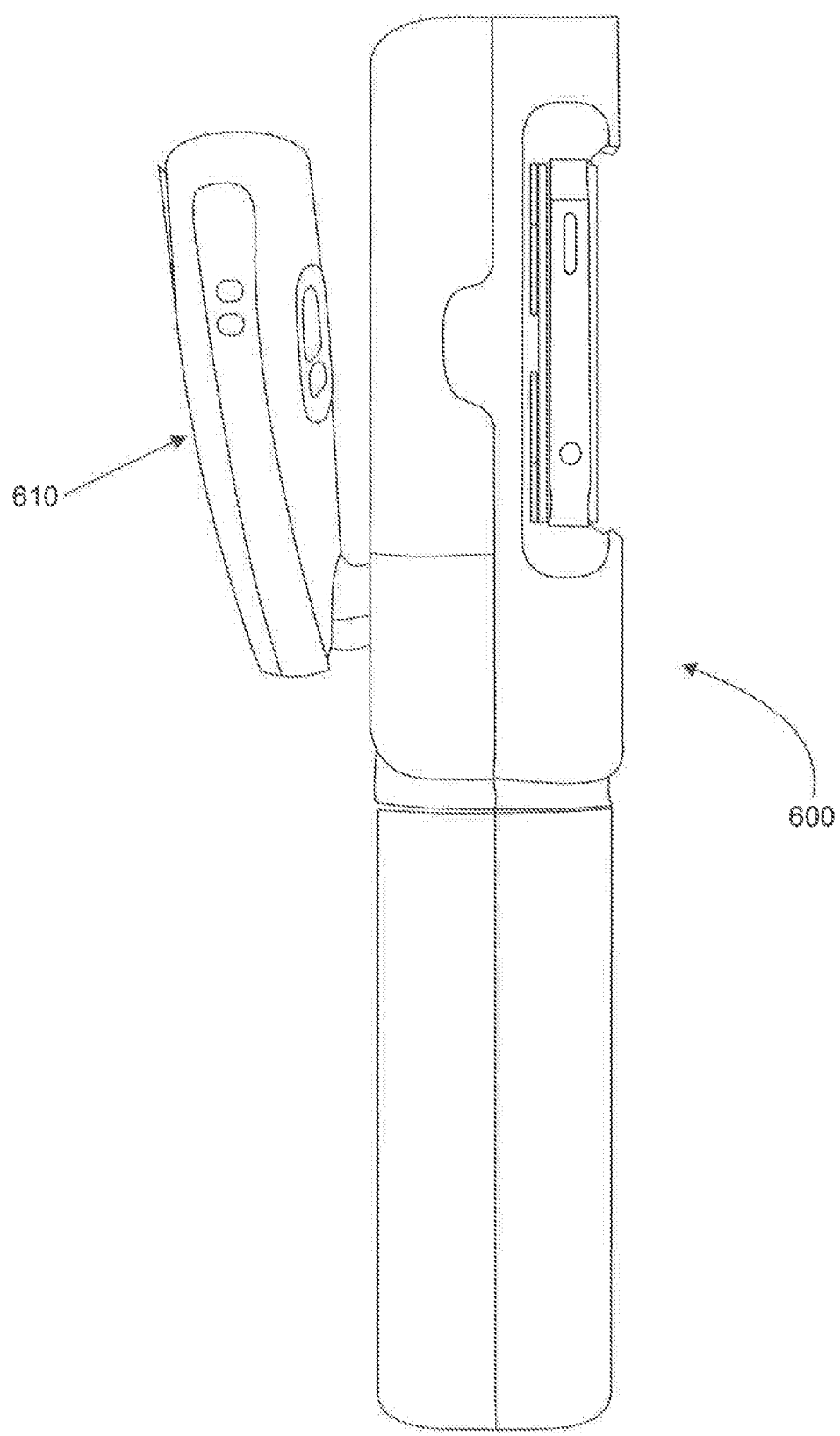
FIG. 6 is a diagrammatic representation of another exemplary apparatus according to a different embodiment of the invention.

FIG. 6 is a diagrammatic representation of an exemplary apparatus (600) according to a different embodiment. In this embodiment one of the at least one auxiliary wireless transceiver (610) is a USB modem that is sold separately from apparatus 600. The processor of apparatus 600 may be configured to register auxiliary wireless transceiver (610) and to use it according to the methods and embodiments described above.

In some embodiments, the system may further allow a bonding device to enhance its bonding utilization and aim it to be optimized for a multitude set of targets, such as WiFi offloading, bi-directional bonding (including downlink video streaming), and operation on general purpose mobile devices such as smartphones, tablets, laptops, Virtual SIM usage, etc.

In some embodiments, a bonding device may include a device that uses multiple modems simultaneously (intended to be simultaneously but in actuality may be near simultaneously since the exact moment of transmission/reception is many times if not all times not under the bonding software layer control but under the specific modem and its network infrastructure control), possibly from different cellular carriers or networks of other types, to carry a single data stream. The device typically applies algorithms to best utilize each of these modems at any given moment. An example of such a device is described in U.S. Pat. No. 7,948,933, whose disclosure is incorporated herein by reference in its entirely. Such devices may be used to transmit in the uplink video (and audio) gathered by cameras at live events, such as breaking news events, sports, entertainment, social events, etc., to a receiving server that reassembles the video streams.

In some embodiments, a bonding device may use a virtual SIM, or multiple virtual SIMS, such as detailed in PCT application PCT/IB2013/053843 which incorporated herein by reference in its entirely. The usage of these VSIMs may be to improve the performance and lower cost by optimizing the utilization by using the right VSIMs for the transmission/reception. In the present disclosure various exemplary embodiments are illustrated, which may contribute to such optimization and general utilization of VSIMs.

In some embodiments, bonding may be also used in the downlink direction towards an end-user device. For example, a bonding device such as a smartphone or tablet may be used for streaming video (e.g., a live stream or a downloaded video) When downloading the video using more than one wireless channels the end-user device has better availability, coverage areas, resiliency to network changes, RF changes and potential latency, than if using a single wireless connection. In other embodiments bonding in both directions may be used in WiFi/WLAN offloading, such as based on various 3GPP standards or industry standards (3GPP i-WLAN and schemes such as the ANDSF discussed in 3GPP TR 23.865 WLAN network selection, TS 23.261 IP flow mobility and seamless WLAN offload, TS 23.402, TS 24.312 ANDSF management, 24.234 3gpp to WLAN internetworking—network protocols, 24.235 WLAN interworking-management, Radio Access Network (RAN) congestion control (e.g., 3GPP feasibility study TR 22.805, TS 22.101 requirements, TS 23.705 draft system enhancements), and related, or such as promoted by the WiFi Broadband Affiance with their Next Generation Hotspot program or as promoted by the WiFi Affiance with the Hotspot 2.0 initiative).

Offloading and roaming applications may also benefit from dual way bonding technology optimized for their needs. Such additional roaming and offloading applications may include hetnet, and roaming between commercial and dedicated-spectrum or network such as in the planned USA FirstNet public safety communication network, etc. In some embodiments the offloading may include bonding (transmission and/or receiving on two or more networks at the same time). The offloading may benefit from the bonding or from the cooperation with the bonding elements. The network may receive actual data about the performance of the involved links in advance of a potential offload, as both links are continuously monitored, and thus the phenomena by which an offload is performed and then the user experience degradation in performance because the new connection is worse/insufficient, may be avoided, also depending on potential policies such as monetization of such better service.

A heterogeneous network (hetnet) is a "3GPP access network consisting of multiple cells with different characteristics (e.g., for the case of E-UTRA: a variety of e-NodeBs, Home e-NodeBs, e-UTRA Relays)" (3GPP TR 21.905). The main intention of such networks and the 3GPP standards developed to handle it (e.g. 3GPP TR 36.839) is that the low power nodes or small cells can be overlaid on top of the macro cells, and then can offload the macro cells and improve indoor and cell edge performance. This usage has been researched mostly in the physical L2 and network layers, addressing issues such as the physical level signal interferences, the L2 and network issues such as node discovery and identification or device identification, enhanced mobility and handovers by "transferring" sessions between nodes, etc. But for this offloading too, bonding in such deployments, e.g., simultaneous usage of multiple nodes using multiple radios in the device has not been discussed, and of course not all subsequent related issues such as controlling it by the application level rather than the physical or L2 levels, of using policies for when to bond, how much to bond, etc., of optimizing the bonding performance, etc.

In some embodiments the following information may be used: the exchange of wireless network, node (e.g., BTS), connectivity, state (e.g., handover), bandwidth (e.g., available backhaul), and monitored performance (e.g., as monitored and measured by bonding device) between the end-user devices or third party cloud based applications and the network components, as well as its utilization. Such information may be available to end user devices, or cloud applications, and their application level software. In addition, for networks utilization and related processes, information monitored and measured in real time, statistical information of the end user devices, and information from the end user devices to the bonding network manager application may be used.

Some embodiments may handle network congestion. A congestion is a situation where network resources may be significantly over-burdened. Such situations might occur due to surge (momentary or permanent) in call or session attempts, due to too large data trafficking, due to insufficient initial resource allocation and network planning, due to various malfunctions, due to malicious attacks, etc. One such instance is in cases where a sudden event like a terror attack occurs, and suddenly all/most people in the area of a certain BTS attempt to call and notify. In such a case, when using LTE (and similarly or equivalently in other standards and technologies), many user devices try to access the network at more or less the same time, over the Random Access Channel (RACH), creating collisions, backing-off and reattempting thus creating further collisions and so on. Further, in times of such congestion it may be very hard or even impossible to provide preemptiveness, i.e., the ability to allow communication of one device while preventing another, or even disconnecting it. In such an example of terror attack, first responders need to get service over a commercially available network, even at the expense of other customers. Other examples of congestions due to usage patterns are: multiple voice calls in LTE, "always connected" services (e.g., push services), video consumption (downlink and/or uplink).

Congestion might occur on any of the network/infrastructure resources, including, for example, the cellular signaling channels (on which SMSs are being exchanged), on the Random Access Control Channels (RACH in LTE, others in other cellular or wireless standards), on other access or other signaling or data air-interface or other infrastructure channels, on the BTS backhaul, on the internal or external backbones, etc. There has been research, standardization activities and ideas on priority Quality of Service (QoS) even under some congestion types, congestion detection, prevention and minimizing or recovery. These are sometimes done within the domain of the specific network involved and by its resources and algorithms, usually using Phy or L2 or network level mechanisms such as data shaping, L2 scheduling, spreading access, backoff mechanisms, etc. As an example, congestion in LTE may be handled in the following way—as said—all inside the network domain and by its own elements and at the Phy/L2/network layer only: "The eNB and the UE support of the Explicit Congestion Notification (ECN) is specified in Section 5 of [35] (i.e., the normative part of [35] that applies to the end-to-end flow of IP packets), and below. This enables the eNB to control the initial codec rate selection and/or to trigger a codec rate reduction. Thereby the eNB can increase capacity (e.g., in terms of number of accepted VoIP calls), and improve coverage (e.g., for high bit rate video sessions). The eNB should set the Congestion Experienced (CE) codepoint ('11') in PDCP SDUs in the downlink direction to indicate downlink (radio) congestion if those PDCP SDUs have one of the two ECN-Capable Transport (ECT) codepoints set. The eNB should set the Congestion Experienced (CE) codepoint ('11') in PDCP SDUs in the uplink direction to indicate uplink (radio) congestion if those PDCP SDUs have one of the two ECN-Capable Transport (ECT) codepoints set," (3GPP TS 136.600). Other examples of similar internal and low level overload controls in 3GPP are: ACB, DSAC (3G), SSAC (LTE), PPAC, eMPS (3GPP TS 23.401 especially in section 4.3, TS 36.331, TS 23.060 section 5.3.6, TS 22.001).

Some embodiments may be used to improve the performance of bonding devices, both in the uplink as well as in the downlink, using new types of and algorithms, improving networks operation and utilization, and optimizing algorithms and mechanisms pertaining to bonding-based applications, services and utilization.

A bonding gateway may include the bonding in the cloud or in infrastructure, performing the bonding assembly in case of receiving bonded traffic from one or more bonding devices, and the disassembly and transmissions/routing in case of sending data to the one or more bonding devices. In some examples it may be a receiver, such as a bonded live video receiver, but it shall be understood that it is just one example of mainly one-way live video traffic out of all the bi-directional application level traffic of all sorts.

A bonding device (7110) is similarly defined (also referred to herein as "end-user bonding device" or an "end node"). A bonding device may be a dedicated bonding device, a general purpose device running a bonding software (e.g., a smartphone, a tablet, a smartphone, a cellular modem or terminal, a WiFi modem or terminal, a satellite modem or terminal, a MW modem or terminal, a COFDM modem or terminal, a Mifi-sort of device, a chipset running cellular protocols, a general purpose or special-purpose processor or chipset, a military computer, a first responder communication device etc., running a bonding software), a bonding software running on any mentioned or other processor or device, or others. In some of the examples it may be a live video transmitter over bonded wireless modem. In other examples a bonding device may be a receiving video or data device, or receiving simultaneously to transmitting, of any type of data or stream. In some embodiments there may be more than one bonding device in the field.

Figure 7:
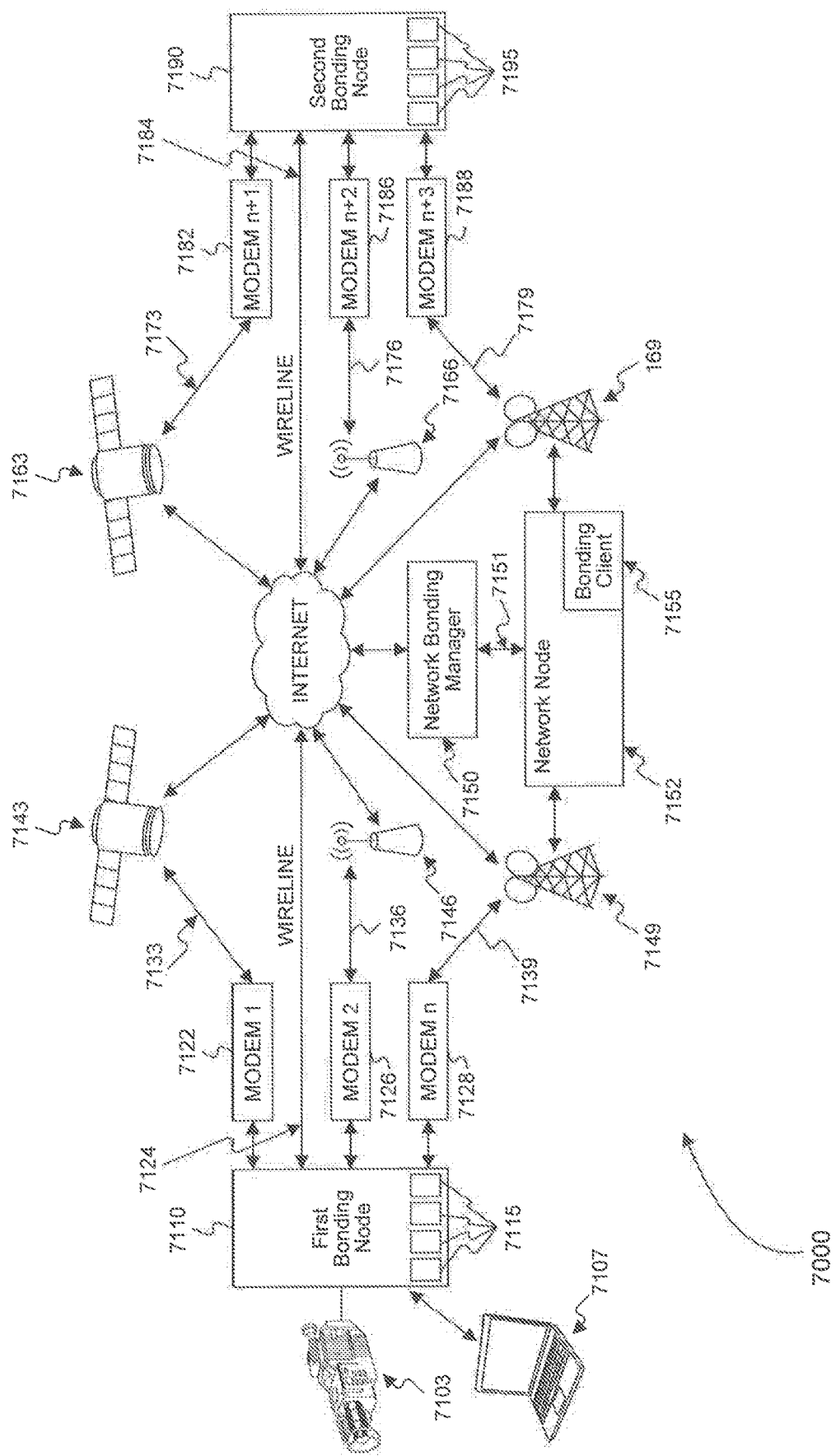
FIGS. 7, 8, and 9 are diagrammatic representations of different embodiments of the present disclosure.
Figure 8:
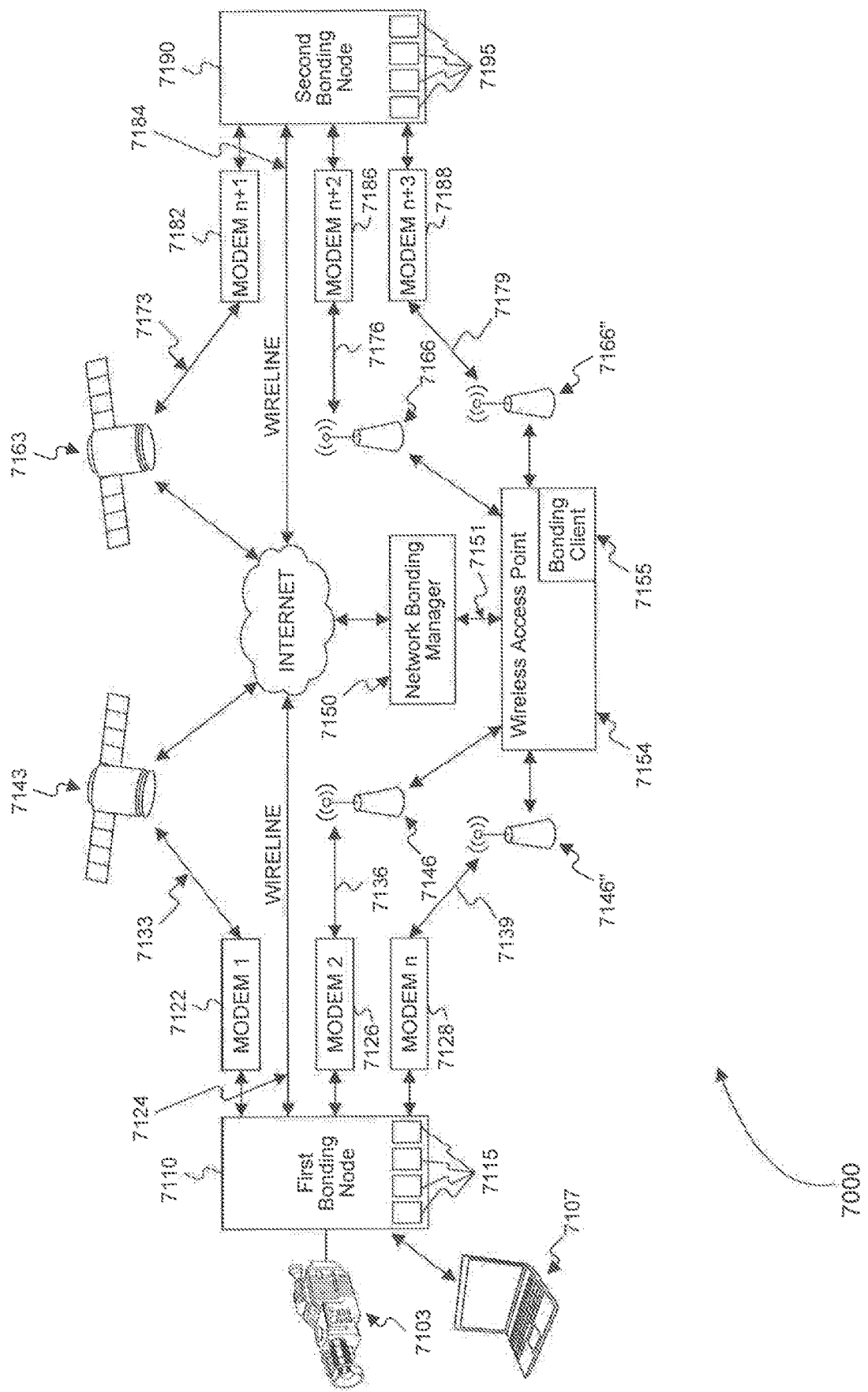
Figure 9:
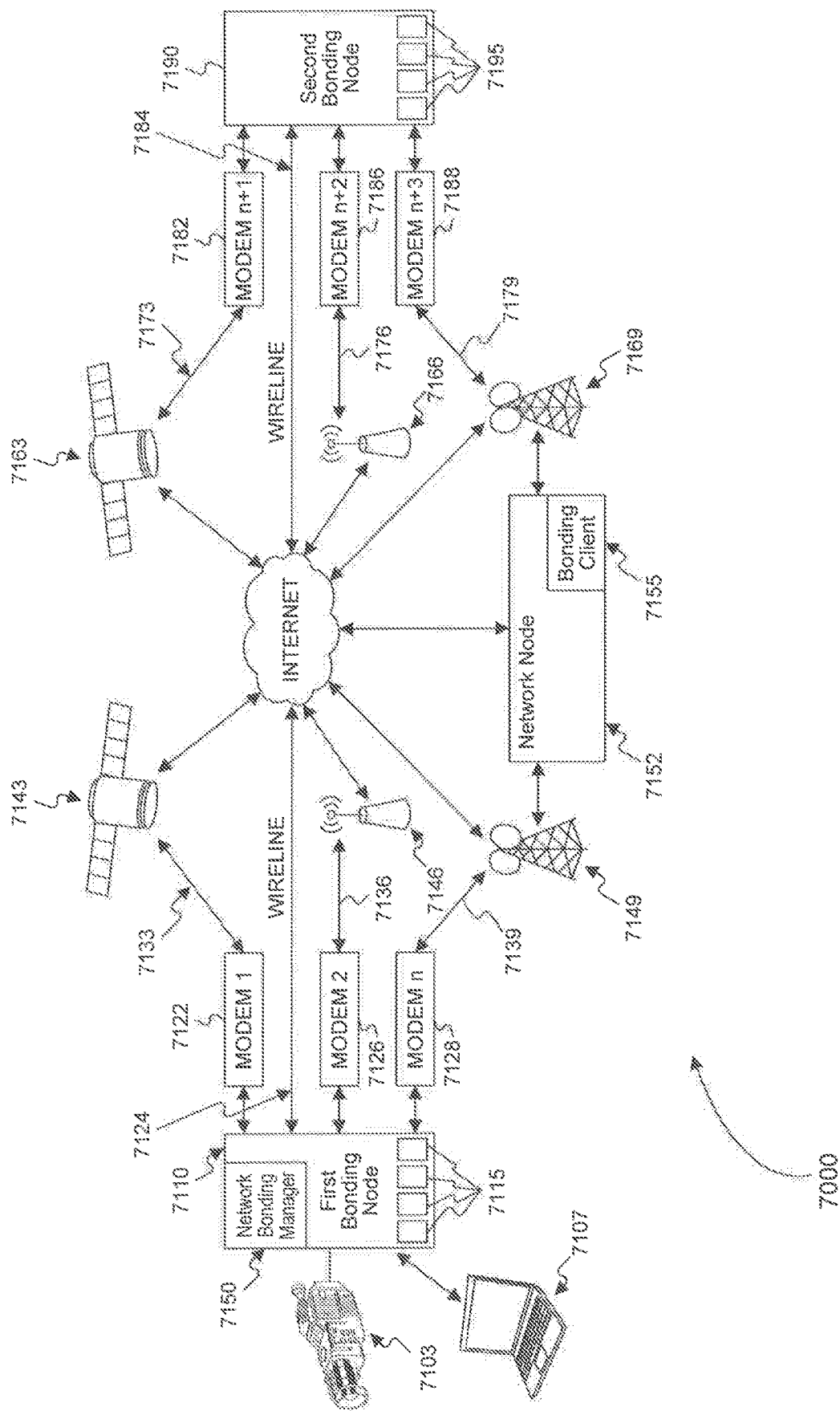
Figure 10:
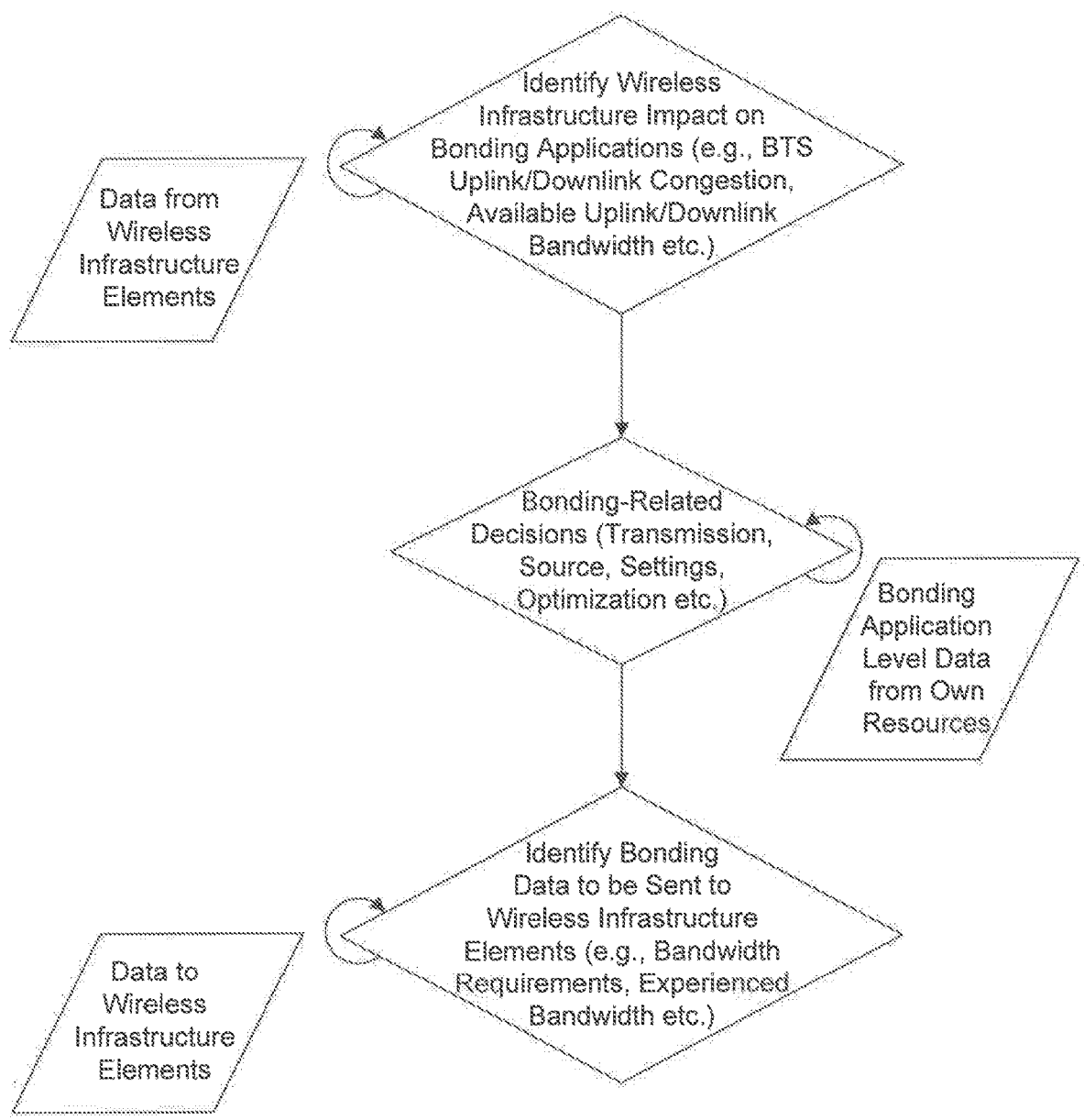
FIG. 10 is a flow chart of an exemplary method for enhanced bonding and network utilization using interaction between a bonding application cloud and a wireless network component, consistent with embodiments of the present disclosure.
Figure 11:
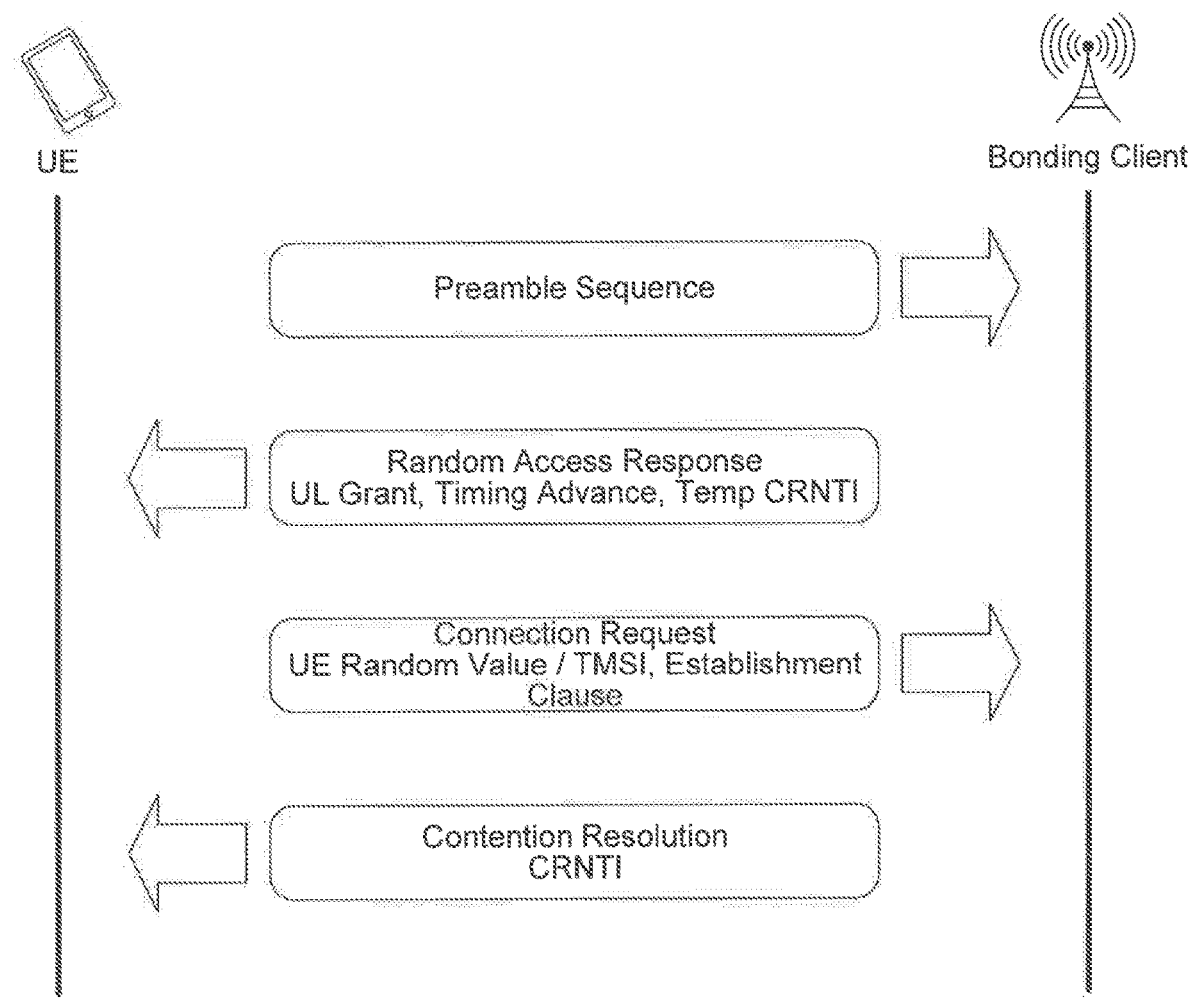
FIG. 11 is a flow chart of an exemplary method for a user device attempting to connect in cellular networks with the new bonding client element in the cellular network to enable notification to/from bonding application elements. A typical RAN congestion control flow between a User Equipment (UE) e.g., a bonding device and a bonding client located next to eNodeB, BTS, WiFi hotspot, Hetnet, RAN element, etc.

The discussion below focus on one side (bonding device 7110 and associated modules). Since the second side (7190) functions similarly, for the sake of clarity it was not described. "Similarly" should not be misinterpreted as "symmetrically," as, for example, 7110 may be using 10 modems of networks A, B and C, whereas 7190 may be using only 2 modems of networks A and X. Although the "internet" is shown in FIG. 7 as a single entity, in practice the network associated with the "internet" typically comprises components of multiple different, interconnected networks. Bonding device 7110 (also referred to herein as "an end node," or "a bonding node"), transmits or receives data simultaneously over multiple, parallel communication network or networks channels, which may be carried by two or more different cellular carriers 7149 (i.e., via two or more different cellular networks intended to be transmitted at the same time per their own or network decisions). The term "simultaneously" is used in the present description and in the claims to indicate that multiple parallel connections are open for data transmission via different modems at the same time. Since the exact timing of transmission is controlled by the actual modems and networks, the actual data transmission itself may not occur at precisely the same time via the different modems.

Furthermore, at various points in time, for various durations and due to various reasons, only a subset of the modems may be selected for use or actually be in use, while the others are used only minimally or not at all, or even shut down, returned to use, etc. These cellular networks may use different technologies and standards. Additionally or alternatively, one or more of modems (7122, 7126, and 7128) may access channels carried by networks of other types, such as wireless local area networks (WLANs) 7146 and satellite networks 7143, as well as wireline networks (7124), and virtual identities may be downloaded to such modems, as well (such as to a satellite or WLAN modem), to the extent required. The data transmitted by the bonding device may reach destination 7190 via wired networks and/or via the same wireless networks that are directly accessed by the bonding device. Device 7110 may include all or some of the modems that it uses inside, as an integral part of the device. Additionally or alternatively, device 7110 may be connected to any number of such modems externally via wires or even wirelessly.

In some embodiments, the device 7110 may use one or more communication network (7149, 7146, 7143 and their respective links 7139, 7136, 133 and 7124). The term "communication network" as used herein refers to any network, network technology, standard, network operator, used to transmit or receive data between two points, mainly but not limited to IP-based data. According to some embodiments, the communication network may include cellular network types, for example GSM, CDMA, 2G, 2.5G, 3G, 4G, LTE, LTE-Advanced, public safety LTE, future gen, an Operator X network; in some embodiments it may include other wireless network types, such as WiFi, Wimax, Wibro, Point to Point microwave or others at any other frequency spectrum, proprietary network, COFDM networks, mesh networks, ad-hoc networks, satellite such as Broadband Global Area Network (BGAN, a Very Small Aperture Terminal (VSAT) Network, a Satcom network, a Satcom-on-the-move (SOTM) network, a Fixed Satellite Services (FSS) network, a Mobile Satellite Services network (MSS), a (geostationary) GEO-based satellite network, a (low Earth Orbits) LEO-based satellite network, a Molniya orbits-based satellite network, and a custom/proprietary satellite network; in some embodiments a communication network may include WPAN such as Zigbee, Bluetooth, UWB, NFC or others; in some embodiments a communication network may include wireline-based networks (7124, 184), such as xDSL, cable modem, fiber optics, LAN, Ethernet, or future;

In some embodiments the bonding device comprises at least one processor configured to associate with a plurality of modems. The term "associate with a plurality of modems" as used herein refers to any relationship, linkage, or action between at least one processor and a plurality of modems for facilitating control or a transfer of data. For example, a processor may be configured to associate if it is enabled to perform a handshake with a modem to enable transmission/reception of a plurality of data streams, traffic, managers, packets, network-related information, etc.

In some embodiments the plurality of modems communicate via a plurality of data channels with an IP connection. The term "IP connection" (e.g., 7139, 7136, 7133, 7124, etc.) as used herein refers to any connectivity between two components or nodes in which datagrams, or packets, encapsulated according to the IP protocol, are relayed (transmitted or received), or an IP session has been created even without such packets exchanged. In some embodiments "IP connection" may refer to IPV4, IPV6 or future versions, or any mix of them. IP is an Internet Protocol, usually using either UDP or TCP protocols and containing source IP address and destination IP address.

The term "modem" (7122, 7126, 7128) as used herein refers to a transmitter, receiver or transceiver, over a communication network, using an IP connection. A modem may handle at least the communication 1st and 2nd layers: L1 Physical (PHY) and L2 (MAC, RLC, etc.). In some embodiments a modem may be a cellular USB "dongle," a module, a satellite terminal, a satellite phone, a cellular smartphone, cellular tablet, a MiFi kind of Access Point, a Software Defined Radio (SDR) device, a COFDM transceiver, a WiFi dangle or module, a xDSL or cable modem, a proprietary modem, a chipset or processor implementing any of the above, and so on. Some embodiments may handle the layers above that of a "modem," mainly application level, with data exchange that in some embodiments pertain to the PHY or L2 characteristics or behavior. The number of potential modems may range from 1 to any (n), at any given moment, and be changed. A modem manager (7115, 7195) may include hardware and/or software that manages the transmission or reception over the modem enabling, for example, modems to be external to the bonding device itself. The number of modem managers does not have to be the same as the number of actual modems. Therefore, bonding device 7110 may comprise special-purpose, dedicated hardware circuits for channel bonding, or it may perform the bonding functions described herein using standard hardware components under the control of software for this purpose, or it may use a combination of standard and special-purpose hardware and software components. In software-based implementations, bonding device 7110 itself may comprise a smartphone, tablet, desktop, laptop or any other suitable general-purpose or special-purpose computing and communication device processor or chipset, running the appropriate software to perform the functions that are described herein. For the sake of all of these various alternatives are referred to as bonding communication devices (or simply "bonding devices") and are represented by device 7110 in the description and the drawings.

Bonding device 7110 may use its bonding capabilities and the facilities of the network to transmit substantially any sort of data, but the large bandwidth afforded by bonding multiple channels is particularly useful in high-speed data streaming. For example, bonding device 7110 may be connected to a video camera 7103 and uploads real-time high-quality video (and typically audio) data to destination 7190. In this case, destination 7190 may be a server belonging to a broadcast company, which reassembles the received video into a coherent stream and may then distribute the video and audio media to viewers. Additionally or alternatively, bonding device 7110 may be connected to a computing device 7107, such as laptop, tablet, smartphone, desktop computer or router, for example. As mentioned earlier, destination 7190 may transmit downlink data to device 7110, in applications, for example, such as high QoS-applications benefiting from such bonding, including video streaming for viewing by one or more end-users connected to the device 7110.

In some embodiments the bonding device may be configured to facilitate video transmission The term "video transmission" (or data transmission or delivery, etc.) as used herein may include transmission of any data that may include video or a portion thereof. In some embodiments the video transmission may include transmission of Audio and/or Video data, live, near-live, or pre-recorded/processed, in any format. The data may be received in any digital form (e.g., SDI, HDMI, h.264, h.265, JPEG-2000, AVC, AAC, AC-3, AMR, LPCM, ADPCM, FFmpeg, PDM, ALAC, or others) or analog form (e.g., composite, component, RCA, or others). For example, encoded video (MPEG2, MPEG4, H.264, H.265, JPEG-2000, AVC, AAC, AC-3, AMR, LPCM, ADPCM, FFmpeg, PDM, ALAC or others, over any transport protocol such as RTMP, RTS, RTSP, MPEG-2TS, HLS, MPEG-DASH, etc.). The list of such encoders, transport streams and protocols is non-exhaustive as even now it is very long and future ones shall very probably come up. The term "live video" may include, a video received from a source (e.g., camera, video recorder, IP video stream, etc.) and transmitted with the intention of not delaying, minimally delaying, or delaying the transmission by the device by more than the required delay according to transmission conditions and required performance. Thus, "live" encompasses levels of delay that are customary in existing live broadcast video transmissions. Customary delay may occur as the result of, for example, video encoding processing time, a modem internal buffer, network scheduling timing, internal device processes, a user selected transmission profile by which more or less delay may be added, etc. The term "near live" as used herein refers to a transmission in which the intention is for live but the user requirements and/or the network conditions do not allow "Real live". For example, if the device is in an area of poor coverage by all modems/networks so that perhaps there's no transmission whatsoever, then the video may be recorded in the device and then transmitted when the device returns to an area with some coverage.

In some embodiments the data packets delivered over some of the plurality of data streams are aggregated to constitute a coherent data stream. The term "coherent stream" (e.g., "coherent video stream" or "coherent data stream") as used herein may refer to a group of data packets that together can be comprehended or that resembles the stream prior to its split. For example, a stream may be "coherent" if the data was transmitted in a plurality of sub-streams and then bonded at or otherwise reassembled or reconstructed prior to its distribution or split between the plurality of data streams, so that it can be comprehended and consumed by non-bonding devices or software awaiting it. In the case of a video transmission, the result of this assembly or reconstruction into a "coherent stream" may be referred to as "coherent video stream" or a "reconstructed video stream," so that the output of this process is a video (audio/video) stream that can be viewed, processed, or otherwise manipulated as such.

In some embodiments the bonding device comprises at least one processor configured to manage at least one of distribution and receipt of a plurality of discrete data streams. The term "plurality of data streams" as used herein may refer to a plurality of substreams that together make up some or all of a larger data set. For example, a plurality of data streams may include the multiple data (video or other), that are created by a bonding device or software in correlation to the currently relevant usable modems or networks so that each such data stream is distributed to be transmitted over at least one such modem or network (or its manager software, buffers, etc.). On the transmission destination side, the plurality of data streams may be received (in part or in full), and then processed as discussed above to create the coherent stream, to request retransmissions of missed or erroneously received packets, etc. In one example, the data streams mainly use IP communication, in other examples the data streams may use any future networking technology and other protocols.

In some embodiments the plurality of modems may be configured to communicate via a plurality of parallel data channels. The term plurality of data channels, or sometimes plurality of modems or of networks or of modem managers, etc., as used herein may refer to a plurality of paths in which the plurality of data streams may be transmitted or received. For example, in a smartphone there may be its own cellular modem and a WiFi, which make it two channels or managers or paths. In such case, the WiFi modem may be tethered to another cellular device, e.g., a MiFi WiFi-cellular router or another smartphone acting as a WiFi Access Point, so in actuality the two bonded paths or channels, for transmission and/or reception, are cellular and WiFi to cellular. The path may go all the way to its final destination, which may be the same IP address or a plurality of destination IP addresses. In the later case, the bonding software that reassembles the stream into a coherent stream may use the multiple destination IP addresses, or one or more of these may be used as proxy, forwarding their received data streams onwards into the IF address to which the bonding software listens. Hence, the device (or the processor or bonding software, etc.), may manage the distribution of the plurality of data streams over the plurality of data channels, in parallel (or with the intention of being parallel, as explained above on the "simultaneous" and "near simultaneous" transmission). This distribution may be done according to multiple parameters as explained in some of the related art described above, as well as in any combination with results of processing network-related information as discussed herein. Similarly the device (or its processor or bonding software, etc.) may also manage the receipt of a plurality of data streams over the plurality of data channels in parallel.

In one embodiment, the bonding network manager (e.g., 7150, 7165) software receives ("push" or "pull") information from the at least one network component (or network element or network node, 7152). The means by which such information is received are immaterial, using any kind of protocol, whether 3GPP related, IP related or other (7151). There may be a software client (7155) residing next to components of the networks (7152), at edge or central locations, or without such client software by which some of the relevant network components exchanges the information with the bonding network manager (7150). This may occur, for example, directly without intermediaries. Further, the bonding manager (7150) may reside in the end-user device (7110) co-located or next to the bonding software itself, or distributed in part to reside in device 7110. Therefore, throughout this text the term "bonding network manager" may be implemented in any partial or full centric or distributed way, and anything in between.

In some embodiments the bonding device comprises at least one processor configured to receive network-related information from a network component located intermediate a first bonding device and a second bonding device. The term "network component" as used herein refers to any component of the network, whether software hardware or any combination of such, whether located in network owner/operator facilities or extended to other locations such as within the end-user devices, modems, chipsets, communication processors, identity cards (e.g., SIM), third parties' locations, cloud, etc., that handles any portion of the traffic passed to/from/within the network, or handles any portion of the operation of the network, its management, its interfaces, etc. For example, a network component may include any element in network routers, gateways, servers, billing, statistics, BTSs, Access Points, RAN nodes, Modes (e.g. eNodeB), RNC, xGSN, xMSC, Iu and other interfaces, HLR, VLR, End-User (EU) devices L2 and PHY processors and managers, xSIM processors and managers, etc.

The term "network-related information" as used herein may refer to any data or information received from a network component or pertaining to it or describing it, even if received from other sources (such as pre-configuration/pre-knowledge). It includes either static, real time, near real time or offline information, related to current, future or past. The bonding network manager (application-layer; 7150) may use this network-related information to enhance and improve the bonding and QoS it, or to enhance or improve the bonding applications associated with it. In one example, related-associated information received from one or more LTE BTSs may contain any combination of data related to bandwidth available to any specific or group of users in that BTS (e.g., current and max uplink and downlink bandwidth available/planned to that user/modem/SIM, etc.), to all users in that BTS (i.e., uplink or downlink current and total capacity), latency related information, error rate related information, location related information, foreseen or planned handover timing and duration related information, RF related information (such as Eo/Io, Eo, Tx power, Tx gain, etc.), current or minimax modulation related information (e.g., QAM16, QAM64, etc.), current or minimax channel and barrier related information (e.g., even as coarse as spectrum, technology, channels allocated such as in MHz or in sub-band IDs, etc.), number of users served, information related to number of or actual identity and capabilities of users attempting to connect, information related to load on access channels, access related information (e.g., min/max/mean/other of the number of access attempts or of the time to access or of the time to access grant or any other data), congestion identification indication (e.g., ECN in LTE—"Explicit Congestion Notification," or other), QoS related information (e.g., in LTE QCI, ARP, GBR, MBR, AMBR, etc.), neighboring cells statistics, etc.

Any portion of this information, in this example and others, may be received from any number of network components. For example, a Ec/Io of a specific modem may be received from the modem itself (including a chipset PHY, L2 or other layer interface), whereas a number of users served may be received from a network component residing in a BTS, and a neighboring cell information may be received from both modem and BTS.

The bonding network manager (7150) may then use the information to decide by itself on optimization of the bonding performance, and/or notify the bonding device or devices or gateways of any derivative of the raw data or of its decisions upon it. These are service affecting decisions taken by the bonding applications (cloud or distributed), impacting both its own service and potentially the network resources utilization and performance of other wireless devices served by it. Further, the bonding network manager may notify other servers, applications or clouds, such as a virtual SIM server (VSIM), cellular operator's HLR, BTSs or other infrastructure systems, LBS services, WiFi operators infrastructure elements, etc.

In one embodiment, a user operates a bonding device 7110 for data transmission and reception, that may be live video uplink transmission for TV news gathering or security surveillance purposes, requiring transmission stability and high quality video, and/or may be downlink video streaming into a large screen, which also requires high bandwidth and stability. For the sake of simplicity we shall now discuss the uplink video transmission only, but the user familiar with it can understand that the same or similar principles and procedures apply to downlink video reception and to both uplink and downlink data transmission and reception respectively.

The user operates the device in bonded transmission of live high quality video. For example, the device may contain 2 cellular modems and 1 WiFi modem. The transmission may require a certain bandwidth (or minimal or optional or a range of bandwidth, etc.), latency, error rate and a minimal jittery behavior. At the beginning of the transmission (or earlier or later), the bonding network manager may query for or otherwise receive data from one or more of wireless (cellular and/or WiFi and/or other) operators servicing the area in which the device is located. Such information may include data about the general service characteristics at that time and location, e.g., the uplink bandwidth currently available, at the BTS/sector servicing each or some of the device modems, or it may be modem specific, such as the bandwidth currently or potentially available to the modem, the modem transmission power, the modem reported neighboring cells, etc. It should be noted that in a certain bonding device (or connected to it), even two of the modems getting service from the same operator may experience/receive different levels. Such differences may be caused by different angles or RF properties for each of the modems at that point in time, resulting in each of them getting service from another sector or even another BTS, RF phenomena, different physical location such as if these two modems are not closely located, different SIMs or SLAs associated with each of the modems, different models of the modems capable of different performance, operator's policies such as the number and service available to each additional modem, bonding device decisions loading each of the modems differently, device or modems mobility and more. The bonding network manager (7150) may then decide upon the information it had received to alert the bonding device or its associated gateway so that bonding application related decisions may be taken such as to various usage alternatives of that operator, of one or more of the device's modems, or derivatives of the raw information.

The bonding application (e.g., at the bonding device 7110 and/or 7150) may consider, for example, the network-related information received to the bonding manager (7150) via link 7151 in order to make certain decisions. The network-related information may include the total available bandwidth in a specific BTS currently serving one or more of the device's modems, may be limited to/by X1. Or, it may consider that the reported available bandwidth for one of such modems is X2. Or, it may consider that the current modulation being used by a certain modem is Q1. Or, it may consider that a handover is due in S1 time, or has just ended, or shall take T1 duration, etc. The bonding service affecting guidance using such data may be, for example, to tell an associated bonding device or it's bonding gateway (bonding receiver in this example), to use modem M1 up to R1 bandwidth at the moment, to stop using it altogether, to use for certain level or types of packets (e.g., FEC or lower priority ones). Further, the bonding network manager may instruct the bonding receiver to tune the bonding retransmission request windows for packets related to this M1 modem or to all the system to latency T1, as a derivative predictive result from the reported data. In this way the bonded transmission may become more stable and efficient.

For example, the bonding device may decide to adjust the distribution of at least one, or plurality of, discrete data streams so that it is not done as it would have been done had this information been unavailable or processing of it been executed. For example, instead of trying to transmit packets that shall not arrive, or not adapting the video encoding bandwidth in time but only after a performance impact or another after-the-fact indication is identified or experienced, the bonding device may avoid that and transmit fewer packets on specific modems, may tune the video encoder accordingly and in time, may turn more or less FEC, etc. When modems are expected to have more bandwidth, a similar process may occur in the other direction. Instead of waiting to experience shorter latency on certain modems, or trying and failing until a different bandwidth is identified, or using a slow-increase try and error bandwidth increment process, now the bonding device may better expect the performance of some or all of its modems, and hence change its encoding and transmission performance much more quickly using a predictive algorithm rather than, or combined with, a trial and error or similar indirect processes such as various anti-hysteresis stepping algorithms. In that way the impact on the video quality may be great, allowing more rapid and more accurate changes in an adaptive video transmission. I.e., in this example as well as in other embodiments, the video encoder output may be increased or decreased in fewer discrete steps and lower interim adjusting and measurements periods. Therefore the allocation of the data streams to the various available modems (or modem managers) may be done quicker and more accurately. Such adjustment may be done in advance, i.e., before a data stream is first allocated to a modem manager, or after the fact, as a re-adjustment, so that packets waiting to be transmitted on a certain modem manager can be re-distributed to another.

The impact of using network-related information by the boding device or bonding manager as part of their decisions making may also benefit the networks and the overall resources allocation, including BTS power consumption, subsequent air-condition, etc, as it may minimize the void transmission by the modems, preventing multi retransmissions or other transmissions of data or requests to transmit that might not be properly fulfilled or signaling transmission by either BTS or device or noise levels at the BTS or experienced by other serviced devices. Further, these other devices may benefit so that they have fewer attempts to access the network or transmit/receive data from it, thus increasing their users' experience including increasing battery time and applications performance.

Further, the bonding network manager may inform the operator's network components about actual performance experienced by a certain modem, for example the actual bandwidth it currently sees, the latency, error rates, etc. This information may then be used by the network components as input to its PHY, L2 or network level decisions, such as whether to allow more or less modems into that sector/BTS, to reduce or increase the allocated bandwidth to any group of the modems, to move certain modems to other sectors/ BTSs where a better local or overall performance may be experienced, to offload some traffic or some of the modems between technologies (e.g., from LTE to 3G) and/or networks (e.g., from LTE to WiFi or Wibro), etc. Further, the information provided from the network components (7152) and the actual information experienced and provided by the bonding device may be used by the bonding network manager (7150) to facilitate artificial intelligence or machine learning, to improve later recommendations and decisions.

Further, in case of predicted handover from a cell, leaving a cell, or handover to another identified cell, due to handover or other information received from the network and/or in combination with performance information from the bonding device (or from the virtual bonding gateway) or its location, the bonding network manager (7150) may guide the device (or the receiver) to reduce the load over put into that modem or other modems associated with that service or network or BTS, or even stop using it altogether; it may do so with a time duration information, e.g., "due to upcoming handoff load this modem at a below B1 bandwidth from T1 to T2 time" (or similar), or indefinitely with a later "reuse" guidance. Such guidance may include, or cause the bonding device (7110) or receiver to, change other settings such as the video encoding bandwidth, the type of packets on each modem, the FEC levels, retransmissions, etc. Further, as described above, the decision may be made directly by the bonding device as part or all of the raw or processed network-related information may be received by it directly from network component (7152) or may be received from the bonding manager (7150), which as said, may be distributed. Also, the exchange of information with the network components (7152) may be subject to any monetization policies, whether by "buying" information from the network, and/or by "selling" information to the network.

The data may be used to request for, and/or actually allocate, better suitable virtual SIMS at every point in time. For example, if the bonding network manager (7150, or as said, the bonding device 7110 itself) calculates and predicts that the performance is expected to get lower, e.g., due to mobility and an upcoming handover (or "handoff," both having here the same meaning) into a cell that is already quite busy and has not sufficient uplink bandwidth available to allocate, then it may instruct the bonding device or any other relevant element to request, allocate or use another VSIM on that modem, a VSIM that is believed/judged to have a better performance. The same may happen of course without movement, such that one BTS or network or operator's network becomes more congested than others, or due to other reasons.

In another example, a smartphone bonding device (7110) runs the bonding software, and has one cellular modem and one WiFi modem available to it. At any point in time, the serving operators may provide (again—by either "push" and/or "pull") data to the bonding network manager. The bonding network manager (7150 or device 7110 itself) may then have better prediction for the potential performance on each of the two modems/networks. It may then guide the bonding device or bonding virtual gateway to offload from one network to the other in a certain degree, up to a full degree, and/or to change its other performance accordingly, such as the video encoding rate, FEC transmission, etc. Thus a better "make before break," or even "never break" continuous service may be provided to the end user and its applications even when offloading. The bonding network manager (7150 or device itself 7110) may also inform the cellular and/or the WiFi network about the actually experienced performance by the modems in that certain location and time. This information may become part of the network offloading mechanisms such as ANDSF to provide a more seamless and continuous service with a better quality of experience to the user, as it shall better decide when to do the offloading. These algorithms may now consider actual application-level experience, measurements and requests, while also relying on actual information pertaining to the performance in the other network (which in many cases is further operated/belongs to another operator).

In another example, the bonding network manager (7150, or device 7110 itself) may use congestion indications (e.g., "Explicit Congestion Notification" ECN in LTE, or others) or identify congestion on its own from indirect information extracted from the network. In such a case, it may guide the bonding algorithms to avoid using that network altogether, or it may instruct some of bonding devices if they are served by the same BTS/cell to stop using it so that the overall utilization for all devices is thus improved, or it may simply notify the device user or customer or other potential customers that may want to transmit from that location or are at the vicinity of that location, that for the moment this is impossible or possible to only a certain degree. Congestion of any element in the network including such that may be remote from the BTS (e.g., backhaul, APN gateway, etc.), or if insufficient resource availability compared to a quality of service desired by it (at the application level), may also be used by the bonding network manager to guide the bonding device (or gateway) accordingly.

Further, when such congestion is identified, the bonding network manager (7150 or device 7110 itself) in another role, may instruct the network to try and resolve the congestion. For example, it may recommend to it to change its transmitted system ID (PLMN, etc.) to a new ID (PLMN, etc.). This may throw out served or attempting devices, clearing the RACH and data channels, allowing only devices that still have the new system ID as a potential System ID in their database to try. Such devices may belong to special paying customers, to first responders, etc. Similar ways to locally and potentially selectively clear the network resources may include other means, such as instructing the network to "fake" power reports and commands to served modems so that the modems believe their transmission is too strong and need reduction, thus reducing overall noise and interferences, or to provide guidance to change other system parameters being transmitted, or to provide guidance to move specific modems to other BTSs because the bonding network manager (7150 or device 7110 itself) knows that these modems see better performance from that other BTS, or may enjoy such better performance.

In addition when the information from the network components (7152) contain location or related information (e.g., Cell ID), then the bonding network manager (7150 or device 7110 itself) may use this for other purpose as well. For example, it may have a service in which registered subscribers or others allow it to post/publish/inform certain other people about their location in case there was a congestion, a terror attack, or in other cases. Further, this service may include low volume "emergency" signaling with this service by which the user uses some low bandwidth communication method over the signaling or data channels to inform the service "I am ok" or "I am hurt" or other similar information. The service may then use this information in several ways.

In another embodiment, a part of the virtual bonding receiver may be co-located next to various network components. For example, running on a processor next to or within BTSs, a measurement and reporting part of the virtual bonding receiver may reside. It may then receive packets related to its serviced subscribers (e.g., according to SIM ids or device IDs, or according to Deep Packet inspection—DPI looking for specific protocol characteristics), analyze these packets for these modems, such as the latency or bandwidth experienced on each, and report to the bonding device itself or to the virtual bonding receiver or to the bonding network manager, etc., about these real time actual application-level measurements so that immediate or subsequent learning optimization may take place. Such optimization may include the bandwidth and other output characteristic of the video encoder feeding the bonding device for uplink transmission, similarly when feeding a bonding transmitter in the downlink direction towards the device, for data transmission in any direction, optimizing the momentary load on associated modems, optimizing the FEC transmission, etc.

In similar ways, a downlink video streaming shall be impacted, as well as any data upload or download. As an example, a downlink bonded transmission, using multiple modems or networks, may now be impacted so that transmission in the downlink is adjusted or readjusted according to network-related information. In similar examples to those described above, if a downlink bonded transmission is performed and the network reports that a certain BTS or modem is about to be allocated a lower bandwidth or a lower modulation, or a handover is about to happen, or the backhaul into the BTS is more loaded so that less downlink traffic may be passed, or a congestion is identified and so on, the transmitting bonding device (7190 in this case, in the downlink into 7110) may consider this information via the bonding network manager (7150) in the cloud and/or in the device itself, and decide to change the distribution of the streams and packets in any way that optimizes the new conditions reported by or derived by or calculated by the network-related information, combined or not with its own measurements, it may decide to change the down-streamed video (or data) encoding rate, its FEC characteristics, its stepping up or down increase or decrease when adjusting to changed bandwidth, its modems usage/utilization, offloading, etc.

The following claims are incorporated in this description and constitute separate embodiments of the invention.

What is claimed is:

1. An apparatus for cooperating with a mobile device with at least one embedded transceiver of a mobile device, the apparatus comprising:
    a housing connectable to a vehicle;
    at least one power port connectable to a DC power supply from the vehicle;
    at least one auxiliary transceiver configured to be powered by the DC power supply from the vehicle; and
    a processor configured to use a wireless communication link between the apparatus and the mobile device, to enable transmission of a first portion of a data stream over the at least one auxiliary transceiver while a second portion of the data stream is simultaneously transmitted over the at least one embedded transceiver.

2. The apparatus of claim 1, further comprising electronic components to regulate and stabilize the DC power supply.

3. The apparatus of claim 1, wherein the at least one power port is a permanent wired connection connected to the DC power supply.

4. The apparatus of claim 1, wherein the at least one power port is connectable to a rechargeable battery DC powered by the DC power supply from the vehicle.

5. The apparatus of claim 1, wherein the at least one auxiliary transceiver includes a transceiver built into the apparatus.

6. The apparatus of claim 1, wherein at least one auxiliary transceiver includes a plurality of auxiliary transceivers.

7. The apparatus of claim 6, wherein at least one of the plurality of auxiliary transceivers is a transceiver in an ad-hoc network.

8. The apparatus of claim 6, wherein the plurality of auxiliary transceivers are associated with a plurality of networks and the processor is further configured to switch between the plurality of networks in order to provide services in an area covered by one of the plurality of networks.

9. The apparatus of claim 6, wherein the at least one auxiliary wireless transceiver is equipped with an RF antenna.

10. The apparatus of claim 1, wherein the processor is further configured to receive wireless service credentials to be associated with the at least one auxiliary wireless transceiver.

11. The apparatus of claim 1, wherein the apparatus is connectable to a receptacle for containing at least one wireless identification card associated with the at least one auxiliary wireless transceiver.

12. The apparatus of claim 1, wherein the processor is further configured to execute decryption algorithms to decrypt the plurality of data streams transmitted by the at least one auxiliary transceiver and the at least one embedded transceiver.

13. The apparatus of claim 1, wherein the at least one auxiliary wireless transceiver is associated with a performance boosting antenna.

14. The apparatus of claim 1, wherein the apparatus is further configured to enable downloading a video stream while the data stream is transmitted using the at least one auxiliary transceiver and the at least one embedded transceiver.

15. The apparatus of claim 1, wherein the processor is further configured to identify congestion of a network associated with the at least one embedded transceiver and to avoid using that network.

16. The apparatus of claim 1, wherein the processor is further configured to inequitably distribute the data stream, such that the first portion is larger than the second portion due to an upcoming handoff in a network associated with the at least one embedded transceiver.

17. An apparatus for cooperating with at least one embedded transceiver of a mobile device, the apparatus comprising:
    a housing connectable to a vehicle;
    at least one power port connectable to a DC power supply from the vehicle;
    a first auxiliary transceiver configured to be powered by the DC power supply from the vehicle and to communicate with the mobile device over a wireless connection;
    at least one second auxiliary transceiver configured to be powered by the DC power supply from the vehicle and to communicate with a server over at least one cellular network; and
    a processor configured to use a communication link between the first auxiliary transceiver and the mobile device over the wireless connection, and to manage a receipt of a plurality of data streams using at least one of the at least one embedded transceiver and the at least one second auxiliary wireless transceiver to enable assembly of a media stream from the plurality of data streams.

18. The apparatus of claim 17, wherein the assembly of the media stream from the plurality of data streams received via multiple data channels is used for high-speed media streaming.

19. The apparatus in claim 17, wherein the processor is further configured to authorize a pairing of a specific mobile device with the apparatus.

20. The apparatus of claim 17, further comprising an antenna associated with the at least one second auxiliary transceiver, wherein the antenna has a gain of at least −5 dBi.

21. The apparatus of claim 17, wherein the apparatus is further configured to enable downlink transmission of a first portion of the plurality of data streams received by the at least one second auxiliary transceiver while a second portion of the plurality of data streams is simultaneously received by the at least one embedded transceiver.

22. The apparatus of claim 17, wherein the apparatus is further configured to enable uplink transmission of a data stream using the at least one second auxiliary transceiver and the at least one embedded transceiver.

23. The apparatus of claim 17, wherein the apparatus is further configured to enable uplink transmission of a first portion of a data stream over the at least one second auxiliary transceiver and a second portion of the data stream over the at least one embedded transceiver in a manner permitting the data stream to be reconstructed at a receiver.

24. The apparatus of claim 23, wherein the apparatus is further configured to enable the uplink transmission while at least some of the plurality of data streams are simultaneously received using the at least one second transceiver and the at least one embedded transceiver.

\* \* \* \* \*